(12) United States Patent
Kim et al.

(10) Patent No.: US 10,606,398 B2
(45) Date of Patent: Mar. 31, 2020

(54) METHOD AND APPARATUS FOR GENERATING PREVIEW DATA

(71) Applicant: Samsung Electronics Co., Ltd., Gyeonggi-do (KR)

(72) Inventors: Sung-Wang Kim, Seoul (KR); Joon-Won Park, Gyeonggi-do (KR); Yun-Hong Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/852,714

(22) Filed: Sep. 14, 2015

(65) Prior Publication Data

US 2016/0077658 A1 Mar. 17, 2016

(30) Foreign Application Priority Data

Sep. 12, 2014 (KR) ........................ 10-2014-0120943

(51) Int. Cl.
| | | |
|---|---|---|
| *G06F 3/041* | (2006.01) | |
| *G06F 3/01* | (2006.01) | |
| *G06F 3/0488* | (2013.01) | |
| *G06F 3/0484* | (2013.01) | |

(52) U.S. Cl.
CPC ............ *G06F 3/0416* (2013.01); *G06F 3/017* (2013.01); *G06F 3/0412* (2013.01); *G06F 3/04845* (2013.01); *G06F 3/04883* (2013.01); *G06F 2203/0381* (2013.01); *G06F 2203/04104* (2013.01); *G06F 2203/04808* (2013.01)

(58) Field of Classification Search
CPC ...... G06F 3/0416; G06F 3/017; G06F 3/0412; G06F 3/04845; G06F 3/04843; G06F 2203/0381; G06F 2203/04104; G06F 2203/04808

See application file for complete search history.

(56) References Cited

U.S. PATENT DOCUMENTS

| | | | |
|---|---|---|---|
| 7,607,109 B2 | 10/2009 | Ohno et al. | |
| 2005/0183038 A1 | 8/2005 | Yamamoto et al. | |
| 2007/0222884 A1 | 9/2007 | Mori et al. | |
| 2010/0062803 A1 | 3/2010 | Yun et al. | |
| 2010/0141826 A1 | 6/2010 | Thorn | |
| 2010/0189358 A1* | 7/2010 | Kaneda | G06K 9/00744 |
| | | | 382/195 |
| 2012/0020643 A1 | 1/2012 | Kato | |

(Continued)

FOREIGN PATENT DOCUMENTS

| | | |
|---|---|---|
| CN | 1641742 A | 7/2005 |
| CN | 101547253 A | 9/2009 |

(Continued)

OTHER PUBLICATIONS

Chinese Search Report dated Mar. 2, 2018.
Chinese Search Report dated Oct. 19, 2018.
Chinese Search Report dated Mar. 25, 2019.

*Primary Examiner* — Sahlu Okebato
(74) *Attorney, Agent, or Firm* — Cha & Reiter, LLC.

(57) ABSTRACT

An electronic device comprising: a display configured to output image data; and at least one processor configured to: detect an input; select a portion of the image data based on the input; and generate a preview of the image data based on the selected portion.

18 Claims, 15 Drawing Sheets

(56) References Cited

U.S. PATENT DOCUMENTS

| | | | |
|---|---|---|---|
| 2013/0021355 A1 | 1/2013 | Ramarao et al. | |
| 2013/0208127 A1* | 8/2013 | Chou | H04N 5/23216 |
| | | | 348/169 |
| 2013/0314580 A1 | 11/2013 | Ju et al. | |
| 2014/0068499 A1 | 3/2014 | Yoo et al. | |
| 2014/0071323 A1* | 3/2014 | Yi | G06F 3/04883 |
| | | | 348/333.01 |
| 2014/0118595 A1* | 5/2014 | Jung | H04N 5/23293 |
| | | | 348/333.01 |
| 2014/0153845 A1 | 6/2014 | Wallace et al. | |
| 2014/0192081 A1 | 7/2014 | Jin et al. | |
| 2014/0210710 A1 | 7/2014 | Shin et al. | |
| 2014/0223307 A1 | 8/2014 | McIntosh et al. | |
| 2015/0288795 A1* | 10/2015 | Park | G06F 3/0485 |
| | | | 455/566 |
| 2016/0041684 A1* | 2/2016 | Rhee | G06F 3/0416 |
| | | | 345/173 |
| 2016/0255268 A1* | 9/2016 | Kang | G06F 3/04845 |
| | | | 348/333.11 |

FOREIGN PATENT DOCUMENTS

| | | |
|---|---|---|
| CN | 101668119 A | 3/2010 |
| CN | 101859224 A | 10/2010 |
| CN | 101867679 B | 7/2013 |
| EP | 2 610 760 A2 | 7/2013 |

\* cited by examiner

METHOD AND APPARATUS FOR GENERATING PREVIEW DATA

CLAIM OF PRIORITY

The present application claims priority under 35 U.S.C. § 119 to an application filed in the Korean Intellectual Property Office on Sep. 12, 2014 and assigned Serial No. 10-2014-0120943, the contents of which are incorporated herein by reference.

BACKGROUND

1. Technical Field the present disclosure relates to electronic devices in general, and more particularly, to a method and apparatus for generating preview data.

2. Description of the Related Art

In recent years, electronic devices which complexly perform one or more functions have been increasingly used. In particular, mobile terminals which are generally known as "smartphones" are the mainstream of the electronic devices. The mobile terminal is provided with a display module of a large screen touch method, and is provided with a high-pixel camera module to be able to photograph a still image or a moving image, in addition to the basic function of communicating with other devices. In addition, the mobile terminal can reproduce multimedia contents such as music, a moving image, etc., and access a network to perform web surfing. The performance of the mobile terminal has been enhanced with the inclusion of a high-performance processor. Therefore, such a mobile terminal is able to perform various functions.

A recent electronic device may generate or store various kinds of data. For example, the electronic device may generate and store image data using a camera function.

SUMMARY

According to aspects of the disclosure, an electronic device is provided comprising: a display configured to output image data; and at least one processor configured to: detect an input; select a portion of the image data based on the input; and generate a preview of the image data based on the selected portion.

According to aspects of the disclosure, a method in an electronic device is provided, comprising: outputting image data comprising at least one frame; detecting, by the electronic device, an input; selecting, by the electronic device, a portion of the image data based on the input; and generating, by the electronic device, a preview of the image data based on the selected portion.

According to aspects of the disclosure, a non-transitory computer-readable medium comprising one or more processor executable instructions which when executed by at least one processor cause the processor to perform a process comprising the steps of: outputting image data comprising at least one frame; detecting an input; selecting a portion of the image data based on the input; and generating a preview of the image data based on the selected portion.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
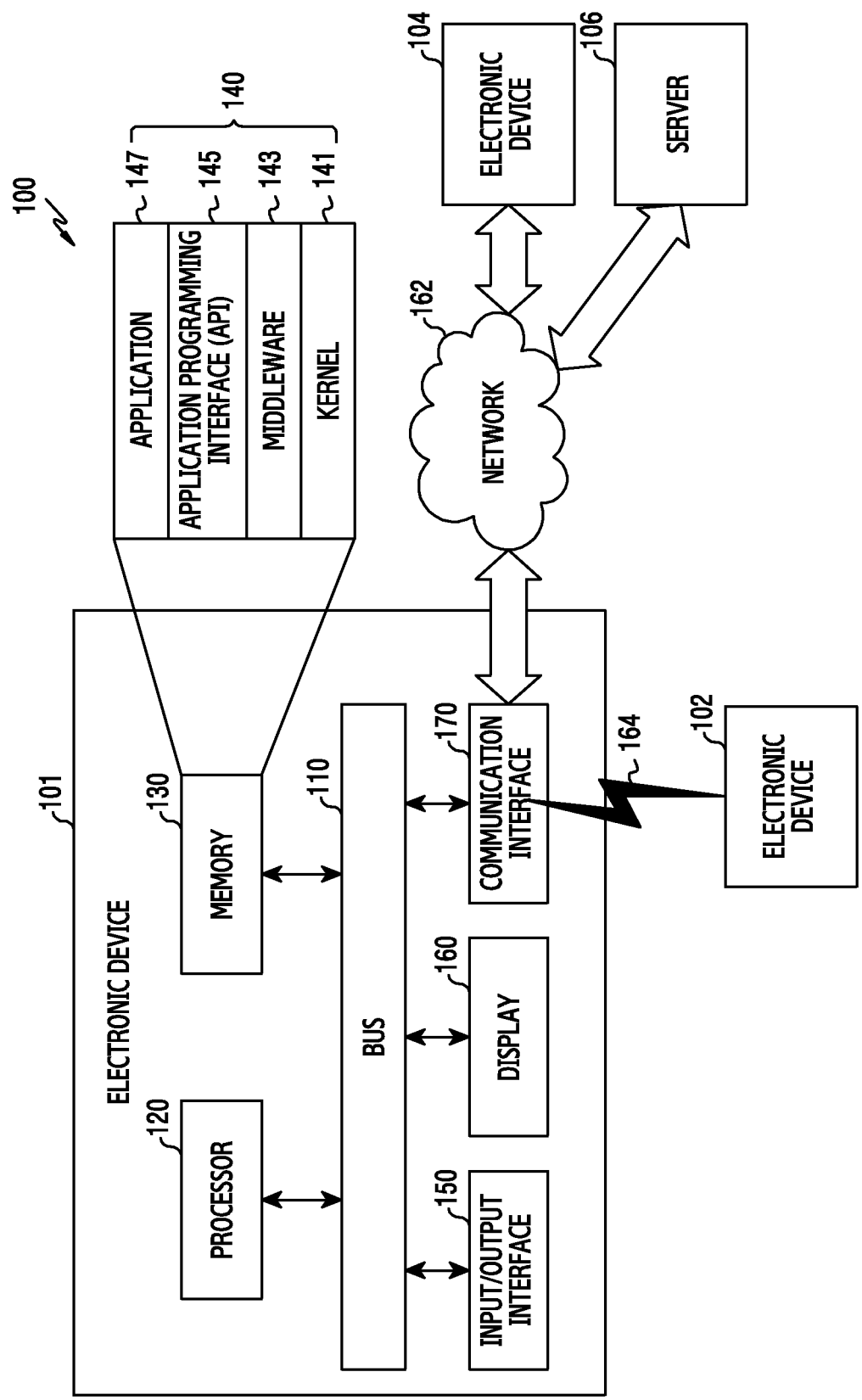
FIG. 1A illustrates is a diagram of an example of a network environment, according to various embodiments.

Hereinafter, the present disclosure is described with reference to the accompanying drawings. The present disclosure may be changed variously and have various embodiments, and specific embodiments are exemplarily described and related detailed descriptions are made in the present specification. However, it should be understood that the various embodiments of the present disclosure are not limited to a specific embodied form and include all modifications and/or equivalents or substitutions that fall within the spirit and technical scope of the present disclosure. In the drawing, like reference numerals are used for like elements.

Expressions such as "include" or "may include", etc. that may be used for the present disclosure indicate existence of a disclosed relevant function, operation, or element, etc., and do not limit additional one or more functions, operations, or elements, etc. Also, it should be understood that terminologies such as "include" or "have", etc. in the present disclosure are intended for designating existence of a characteristic, a number, a step, an operation, an element, a part, or a combination of these described on the specification and do not exclude in advance existence or addition possibility of one or more other characteristics, numbers, steps, operations, elements, parts, or a combination of these.

Conjunctions such as "or", etc. in the present disclosure includes a certain and all combinations of words listed together. For example, "A or B" may include A and may include B, or include both A and B.

In the present disclosure, expressions such as "1st", "2nd", "first" or "second", etc. may modify various elements of the present disclosure but do not limit relevant elements. For example, the expressions do not limit sequence and/or importance, etc. of relevant elements. The expressions may be used for discriminating one element from another element. For example, both a first user apparatus and a second user apparatus are all user apparatuses, and represent different user apparatuses. For example, a first element may be named as a second element without departing from the scope of the present disclosure, and similarly, the second element may be named as the first element.

When it is mentioned that a certain element is "connected to" or "accesses" another element, it should be understood that the element may be directly connected to another element or may directly access another element, but still another element may exist in the middle. In contrast, when it is mentioned that a certain element is "directly connected to" or "directly accesses" another element, it should be understood that still another element does not exist in the middle.

A terminology used in the present disclosure is used for explaining only a specific embodiment and is not intended for limiting the present disclosure. Unless clearly expressed otherwise, expression of the singular includes expression of the plural.

Unless defined differently, all terminologies used herein including technological or scientific terminologies have the same meaning as that generally understood by a person of ordinary skill in the art to which the present disclosure belongs. It should be understood that generally used terminologies defined by a dictionary have meaning coinciding with meaning on context of a related technology, and unless clearly defined in the present disclosure, they are not understood as an ideal or excessively formal meaning.

An electronic device according to the present disclosure may be a device including a communication function. For example, an electronic device may include at least one of a smartphone, a tablet personal computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, or a wearable device (e.g., a head-mounted-device (HMD) such as electronic glasses, an electronic clothing, an electronic bracelet, an electronic necklace, an electronic accessory, an electronic tattoo, or a smartwatch).

According to certain embodiments, an electronic device may be a smart home appliance having a communication function. A smart home appliance may include, for example, at least one of a television, a Digital Video Disk (DVD) player, an audio, a refrigerator, an air conditioner, a cleaner, an oven, an electronic range, a washing machine, an air purifier, a set-top box, a TV box (e.g., Samsung HomeSync™, Apple TV™, or Google TV™), game consoles, an electronic dictionary, an electronic key, a camcorder, or an electronic frame.

According to certain embodiments, an electronic device may include at least one of various medical devices (e.g., Magnetic Resonance Angiography (MRA), Magnetic Resonance Imaging (MRI), Computed Tomography (CT), a shooting device, an ultrasonic device, etc.), a navigation device, a Global Positioning System (GPS) receiver, an event data recorder (EDR), a flight data recorder (FDR), an automobile infotainment device, electronic equipment for a ship (e.g., a navigation device for a ship, a gyro compass, etc.), avionics, a security device, or a robot for an industrial use or a home use.

According to certain embodiments, an electronic device may include at least one of a furniture or a portion of a building/structure including a communication function, an electronic board, an electronic signature receiving device, a projector, or various measurement devices (e.g., waterworks, electricity, gas, or radio wave measuring device, etc.). An electronic device according to the present disclosure may be a combination of one or more of the above-described devices. Also, it is obvious to a person of ordinary skill in the art that the electronic device according to the present disclosure is not limited to the above-described devices.

Hereinafter, an electronic device according to various embodiments of the present disclosure is described with reference to the accompanying drawings. A terminology of a user used in various embodiments may indicate a person who uses an electronic device or a device (e.g., artificial intelligence electronic device) that uses the electronic device.

FIG. 1A is a diagram of an example of a network environment 100 including an electronic device 101, according to various embodiments. Referring to FIG. 1, the electronic device 101 may include a bus 110, a processor 120, a memory 130, an input/output (I/O) interface 150, a display 160, and a communication interface 170.

The bus 110 may be a circuit for connecting the above-described elements with each other, and transferring communication (e.g., a control message) between the above-described elements.

The processor 120 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a communication processor, a graphic processing unit (GPU) etc.

The processor 120 may receive, for example, an instruction from the above-described other elements (e.g., the memory 130, the I/O interface 150, the display 160, or the communication interface 170, etc.) via the bus 110, decipher the received instruction, and execute an operation or a data process corresponding to the deciphered instruction.

The memory 130 may include any suitable type of volatile or non-volatile memory, such as Random Access Memory (RAM), Read-Only Memory (ROM), Network Accessible Storage (NAS), cloud storage, a Solid State Drive (SSD), etc. The memory 130 may store an instruction or data received from the processor 120 or other elements (e.g., the I/O interface 150, the display 160, or the communication interface 170, etc.), or generated by the processor 120 or other elements. The memory 130 may include, for example, programming modules 140 such as a kernel 141, a middleware 143, an application programming interface (API) 145, or an application 147. The each of the programming modules may be configured using software, firmware, hardware, or a combination of two or more of these.

The kernel 141 may control or manage system resources (e.g., the bus 110, the processor 120, or the memory 130, etc.) used for executing an operation or a function implemented in the rest of the programming modules, for example, the middleware 143, the API 145, or the application 147. Also, the kernel 141 may provide an interface for allowing the middleware 143, the API 145, or the application 147 to access an individual element of the electronic device 101 and control or manage the same.

The middleware 143 may perform a mediation role so that the API 145 or the application 147 may communicate with the kernel 141 to give and take data. Also, in connection with task requests received from the applications 147, the middleware 143 may perform a control (e.g., scheduling or load balancing) for a task request using, for example, a method of assigning priority that may use a system resource (e.g., the bus 110, the processor 120, or the memory 130, etc.) of the electronic device 101 to at least one application 134.

The API 145 is an interface for allowing the application 147 to control a function provided by the kernel 141 or the middleware 143, and may include at least one interface or function (e.g., an instruction) for file control, window control, image processing, or character control, etc.

According to various embodiments, the application 147 may include a Short Message Service/Multimedia Messaging Service SMS/MMS application, an e-mail application, a calendar application, alarm application, a health care application (e.g., an application for measuring quantity of motion or blood sugar, etc.), or an environment information application (e.g., an application providing atmospheric pressure, humidity or temperature information, etc.). Additionally or alternatively, the application 147 may be an application related to information exchange between the electronic device 101 and an external electronic device (e.g., the electronic device 102 or 104). The application related to the information exchange may include, for example, a notification relay application for transferring specific information to the external electronic device or a device management application for managing the external electronic device.

For example, the notification relay application may include a function for transferring notification information generated from a different application (e.g., an SMS/MMS application, an e-mail application, a health care application, or an environment information application) of the electronic device 101 to an external electronic device (e.g., the electronic device 102 or 104). Additionally or alternatively, the notification relay application may, for example, receive notification information from an external electronic device (e.g., the electronic device 102 or 104) and provide the same to a user. The device management application may manage (e.g., install, delete, or update) a function (e.g., turn-on/turn-off of an external electronic device itself (or some constituent part) or luminance (or resolution) control of a display) of an external electronic device (e.g., the electronic device 102 or 104) communicating with the electronic device 101 and an application operating in the external electronic device or a service (e.g., a communication service or a message service) provided by the external electronic device.

According to various embodiments, the application 147 may include a designated application depending on an attribute (e.g., a kind of an electronic device) of the external electronic device (e.g., the electronic device 104). For example, in the case where the external electronic device is an MP3 player, the application 147 may include an application related to music reproduction. Similarly, in the case where the external electronic device is a mobile medical health care device, the application 147 may include an application related to health care. According to an embodiment, the application 147 may include at least one of an application designated in the electronic device 101 and an application received from the external electronic device (e.g., the server 106, the electronic device 102 or 104).

The I/O interface 150 may transfer an instruction or data input from a user via an I/O unit (e.g., a sensor, a keyboard, or a touchscreen) to the processor 120, the memory 130, or the communication interface 170 via the bus 110, for example. For example, the I/O interface 150 may provide data regarding a user's touch input via the touchscreen to the processor 120. Also, the I/O interface 150 may, for example, output an instruction or data received via the bus 110 from the processor 120, the memory 130, or the communication interface 170 via the I/O unit (e.g., a speaker or a display). For example, the I/O interface 150 may output voice data processed by the processor 120 to a user via a speaker.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160 may display various types of contents (for example, text, images, videos, icons, or symbols) for users. The display 160 may include a touch screen, and may receive, for example, a touch, gesture, proximity, or hovering input by using an electronic pen or a part of the user's body.

According to an embodiment, the display 160 may display a contact list based on a priority of each of the contacts included in the contact list. For example, the priority of the contacts may be determined based on at least one of a transmission history, a transmission frequency, a transmission speed, a charging policy, intimacy, a counterpart's location, a schedule, or application preference.

According to an embodiment, the display 160 may display a service list based on a priority of each of the applications or services included in the service list. For example, the priority of the applications or services may be determined based on configuration information of a service provider, configuration information of a manufacturer, contact information, application preference, user preference, a use time point, a distance from a target to share contents, a transmission history, and a charging policy.

The communication interface 170 may connect communication between the electronic device 101 and an external device (for example, the electronic device 104 or the server 106). For example, the communication interface 170 may be connected to a network 162 through wireless communication or wired communication, and may communicate with an external device.

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM) as a cellular communication protocol.

The wireless communication may include at least one of, for example, WiFi, Bluetooth, BLE, Zigbee, Infrared (IR) communication, and ultrasonic communication as a short-range communication protocol 164.

The wired communication may include, for example, at least one of universal serial bus (USB), high definition multimedia interface (HDMI), recommended standard 232 (RS-232), and plain old telephone service (POTS).

The network 162 may include at least one of communication networks such as a computer network (for example, a LAN or a WAN), the Internet, and a telephone network.

The electronic devices 102 and 104 may be devices of the same type as that the electronic device 101 or devices of different types from that of the electronic device 101. According to an embodiment, the server 106 may include a group of one or more servers. According to various embodiments, all or some of the operations executed by the electronic device 101 may be carried out in another electronic device or a plurality of electronic devices (for example, the electronic device 102 or 104 and the server 106). According to an embodiment, when the electronic device 101 should perform some functions or services automatically or by a request, the electronic device 101 may make a request for performing at least some functions related to the functions or services to another device (for example, the electronic device 102 or 104, or the server 106) instead of performing the functions or services by itself or additionally. The electronic device (for example, the electronic device 102 or 104, or the server 106) may carry out the functions requested by the electronic device 101 or additional functions and provide results thereof to the electronic device 101. The electronic device 101 may provide the requested functions or services to another electronic device based on the received results or after additionally processing the received results. To this end, for example, cloud computing, distributed computing, or client-server computing technology may be used.

Figure 1B:
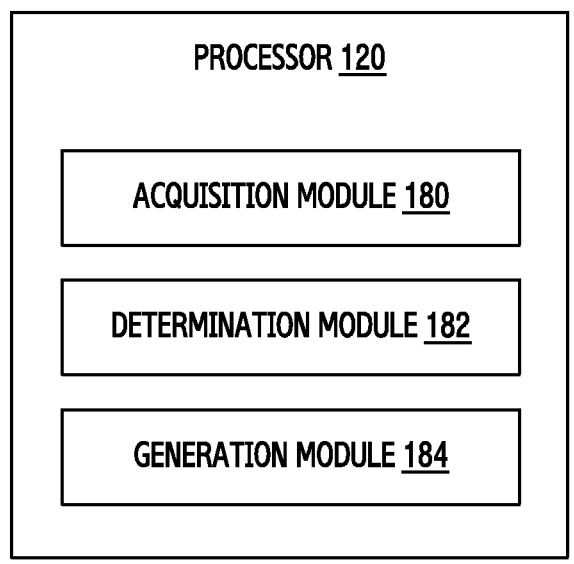
FIG. 1B is a diagram of an example of a processor, according to various embodiments.

FIG. 1B is a diagram of an example of a processor, according to various embodiments.

According to various embodiments, the processor 120 may be an element of an electronic device (for example, the electronic device 101 of FIG. 1A).

According to various embodiments, the processor 120 may include an acquisition module 180, a determination module 182, or a generation module 184.

The acquisition module 180 may acquire and output image data. According to an embodiment, the image data may be a screen which is displayed by at least one application. For example, the at least one application may include a game application, a multimedia reproduction application, a browser application, a document application, a chatting application, a schedule management application, a camera application, etc.

The determination module 182 may identify an area to be used as preview data from image data outputted by the acquisition module 180, stored image data, image data provided by another electronic device, etc. According to various embodiments, the determination module 182 may detect an input on the image data (or a screen outputting the image data), and process to use an area of the image data corresponding to a location where an input satisfying a condition is detected as preview data. The area to be used as the preview data may be at least part of the image data. For example, an image including a predetermined range with reference to the location where the input satisfying the condition is detected may be used as the preview data.

According to various embodiments, the condition may be related to the number of times of touch operations on the screen. According to an embodiment, the determination module 182 may identify a location where a pre-defined number of touch inputs are detected, and process to use a part of image data related to the identified location as preview data. For example, the determination module 182 may identify an image including a predetermined range with reference to the location where the pre-defined number of touch inputs are detected in the image data, and process to use the identified image as preview data.

According to various embodiments, the condition may be related to a point of time when a voice is inputted. According to an embodiment, the determination module 182 may identify a point of time when a user's voice is inputted, while storing image data, and process to use an image related to the identified point of time as preview data. For example, when image data including a plurality of frames is stored, the determination module 182 may process to use at least part of image frames corresponding to a point of time when a voice input is detected as preview data. According to various embodiments, the determination module 182 may identify a location satisfying a condition (for example, the number of times of touch operations) in the image frames selected based on the voice input, and use an area based on the identified location as preview data.

According to various embodiments, the condition may be related to a touch input point. The touch input point may be related to an input for defining a focus on image data. According to an embodiment, the determination module 182 may detect an input for defining a focus prior to storing image data, and process to use an image related to a location where the input is detected as preview data. For example, the determination module 182 may identify an image including a predetermined range with reference to the location where the input for defining the focus is detected, and process to use the identified image as preview data.

Furthermore, the touch input point may be related to a touch input (second touch input) which is detected after the input for defining the focus (first touch input) is detected. According to an embodiment, the determination module 182 may identify the location of the second touch input detected continuously after the first touch input, and process to use an image related to the identified location of the second touch input as preview data. For example, when the determination module 182 detects the first touch input and the second touch input prior to storing the image data, the determination module 182 may identify an image including a predetermined range with reference to the location where the second touch input is detected, and process the identified image as preview data.

According to various embodiments, the condition may be related to a layer which is formed on image data. The layer may be a screen which floats on image data. According to an embodiment, the determination module 182 may process to use an image related to the location of the layer formed on the image data as preview data. For example, the determination module 182 may process to use an image including a predetermined range with reference to the location of the layer formed on the image data as preview data.

The generation module 184 may generate storable data based on the image data identified by the acquisition module 180. The storable data may be data which includes at least one image frame outputted to the screen. For example, the storable data may be image data which includes a single image frame or moving image data which includes a plurality of image frames.

According to various embodiments, the generation module 184 may generate preview data based on an area of the image data corresponding to an input which is identified as satisfying a condition by the determination module 182. According to an embodiment, the generation module 184 may generate the preview data by cropping the area corresponding to the input satisfying the condition from the image data. For example, the generation module 184 may be provided with location information of the area corresponding to the input satisfying the condition by the determination module 182, identify a location corresponding to the provided location information in the image data, and generate the preview data of a pre-defined size with reference to the identified location.

Figure 2:
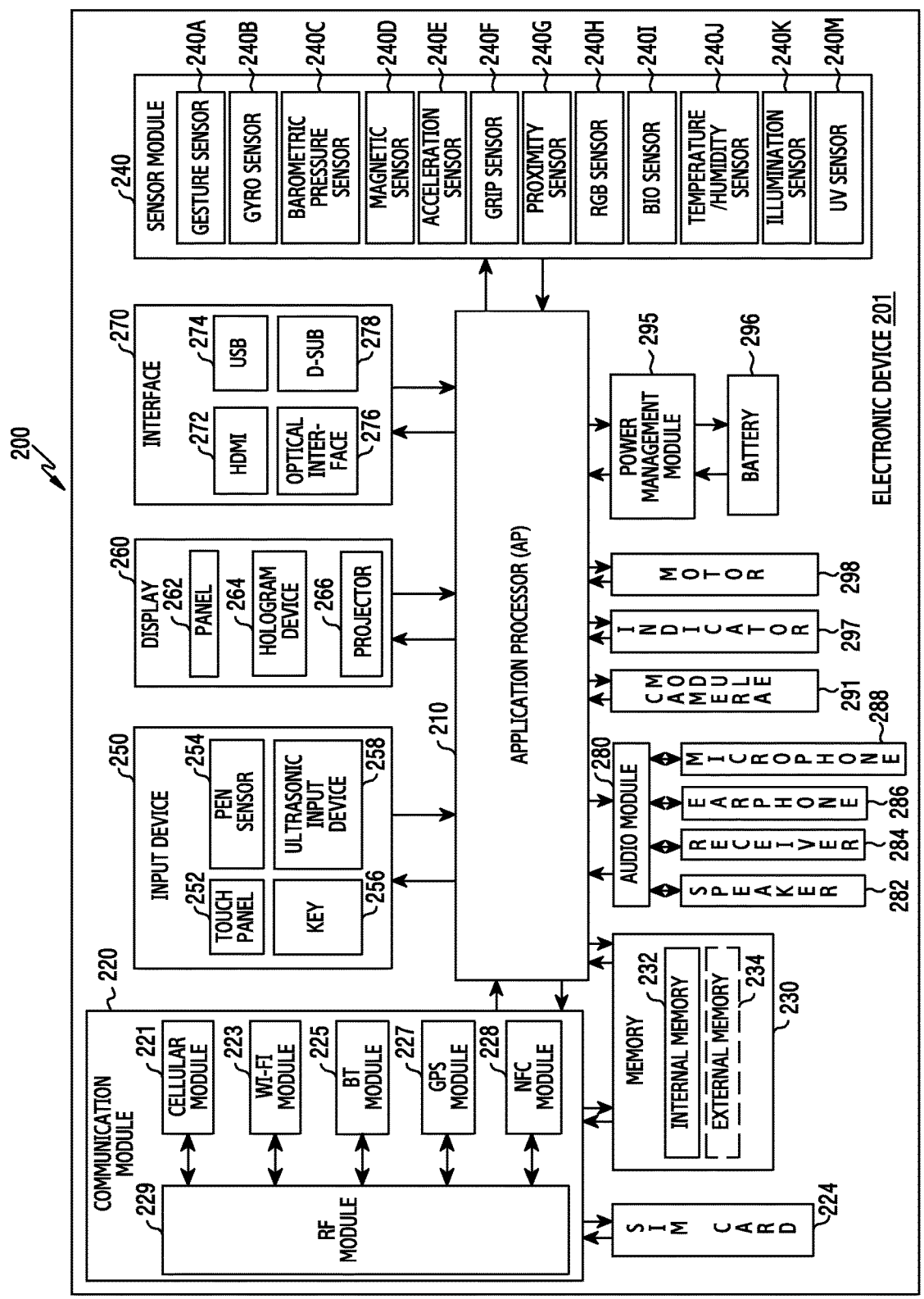
FIG. 2 is a diagram of an example of an electronic device, according to various embodiments.

FIG. 2 is a block diagram 200 of an example of an electronic device 201, according to various embodiments of the present disclosure. The electronic device 201 may configure, for example, all or a portion of the electronic device 101 illustrated in FIG. 1. Referring to FIG. 2, the electronic device 201 may include one or more application processors (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, or a motor 298.

The AP 210 may drive an OS or an application to control a plurality of hardware or software elements connected to the AP 210, and perform various data processes including multimedia data and operations. The AP 210 may be implemented, for example, as a system on chip (SoC). According to an embodiment, the AP 210 may further include a graphic processing unit (GPU) (not shown).

The communication module 220 (e.g., the communication interface 170) may perform data transmission/reception in communication between the electronic device 201 (e.g., the electronic device 101) and other electronic devices (e.g., the electronic device 102, 104 or the server 106) connected via a network. According to an embodiment, the communication module 220 may include a cellular module 221, a Wi-Fi module 223, a BT module 225, a GPS module 227, an NFC module 228, and a Radio Frequency (RF) module 229.

The cellular module 221 may provide voice communication, image communication, a short message service, or an Internet service, etc. via a communication network (e.g., LTE, LTE-A, CDMA, WCDMA, UMTS, WiBro, or GSM, etc.). Also, the cellular module 221 may perform discrimination and authentication of an electronic device within a communication network using, for example, a subscriber identity module (e.g., a SIM card 224). According to an embodiment, the cellular module 221 may perform at least a portion of functions that may be provided by the AP 210. For example, the cellular module 221 may perform at least a portion of a multimedia control function.

According to an embodiment, the cellular module 221 may include a communication processor (CP). Also, the cellular module 221 may be, for example, implemented as a SoC. Though elements such as the cellular module 221 (e.g., a communication processor), the memory 230, or the power management module 295, etc. are illustrated as elements separated from the AP 210 in FIG. 2, according to an embodiment, the AP 210 may be implemented to include at least a portion (e.g., the cellular module 221) of the above-described elements.

According to an embodiment, the AP 210 or the cellular module 221 (e.g., a communication processor) may load an instruction or data received from at least one of a non-volatile memory and other elements connected thereto onto a volatile memory, and process the same. Also, the AP 210 or the cellular module 221 may store data received from at least one of other elements or generated by at least one of other elements in a non-volatile memory.

Each of the Wi-Fi module 223, the BT module 225, the GPS module 227, or the NFC module 228 may include, for example, a processor for processing data transmitted/received via a relevant module. Though the cellular module 221, the Wi-Fi module 223, the BT module 225, the GPS module 227, or the NFC module 228 are illustrated as separate blocks in FIG. 2, according to an embodiment, at least a portion (e.g., two or more elements) of the cellular module 221, the Wi-Fi module 223, the BT module 225, the GPS module 227, or the NFC module 228 may be included in one Integrated Circuit (IC) or an IC package. For example, at least a portion (e.g., a communication processor corresponding to the cellular module 221 and a Wi-Fi processor corresponding to the Wi-Fi module 223) of processors corresponding to each of the cellular module 221, the Wi-Fi module 223, the BT module 225, the GPS module 227, or the NFC module 228 may be implemented as one SoC.

The RF module 229 may perform transmission/reception of data, for example, transmission/reception of an RF signal. The RF module 229 may include, for example, a transceiver, a power amp module (PAM), a frequency filter, or a low noise amplifier (LNA), etc., though not shown. Also, the RF module 229 may further include a part for transmitting/receiving an electromagnetic wave on a free space in wireless communication, for example, a conductor or a conducting line, etc. Though FIG. 2 illustrates the cellular module 221, the Wi-Fi module 223, the BT module 225, the GPS module 227, and the NFC module 228 share one RF module 229, according to an embodiment, at least one of the cellular module 221, the Wi-Fi module 223, the BT module 225, the GPS module 227, or the NFC module 228 may perform transmission/reception of an RF signal via a separate RF module.

The SIM card 224 may be a card including a subscriber identify module, and may be inserted into a slot formed in a specific position of the electronic device. The SIM card 224 may include unique identity information (e.g., integrated circuit card identifier (ICCID)) or subscriber information (e.g., international mobile subscriber identity (IMSI)).

The memory 230 (e.g., the memory 130) may include a built-in memory 232 or an external memory 234. The built-in memory 232 may include, for example, at least one of a volatile memory (e.g., dynamic RAM (DRAM), static RAM (SRAM), synchronous dynamic RAM (SDRAM)) and a non-volatile memory (e.g., one-time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an embodiment, the built-in memory 232 may be a Solid State Drive (SSD). The external memory 234 may further include a flash drive, for example, compact flash (CF), secure digital (SD), micro secure digital (Micro-SD), mini secure digital (Mini-SD), extreme digital (xD), or a memory stick. The external memory 234 may be functionally connected to the electronic device 201 via various interfaces. According to an embodiment, the electronic device 201 may further include a storage device (or a storage medium) such as a hard drive.

The sensor module 240 may measure a physical quantity or detect an operation state of the electronic device 201, and convert the measured or detected information to an electric signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., RGB (red, green, blue) sensor), a living body sensor 240I, a temperature/humidity sensor 240J, an illuminance sensor 240K, or an ultra violet (UV) sensor 240M. Additionally or alternatively, the sensor module 240 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown), etc. The sensor module 240 may further include a control circuit for controlling at least one sensor belonging thereto.

The input unit 250 may include a touch panel 252, a (digital) pen sensor 254, a key 256, or an ultrasonic input unit 258. The touch panel 252 may recognize a touch input using at least one of capacitive, resistive, infrared, or ultrasonic methods. Also, the touch panel 252 may further include a control circuit. A capacitive touch panel may perform detection by a physical contact or proximity recognition. The touch panel 252 may further include a tactile layer. In this case, the touch panel 252 may provide a tactile reaction to a user.

The (digital) pen sensor 254 may be implemented using, for example, a method which is the same as or similar to receiving a user's touch input, or using a separate sheet for detection. The key 256 may include, for example, a physical button, an optical key or keypad. The ultrasonic input unit 258 is a unit for recognizing data by detecting a sound wave using a microphone (e.g., a microphone 288) in the electronic device 201 via an input tool generating an ultrasonic signal, and enables wireless recognition. According to an embodiment, the electronic device 201 may receive a user input from an external device (e.g., a computer or a server) connected to the communication module 220 using the communication module 220.

The display 260 (e.g., the display 150) may include a panel 262, a hologram device 264, or a projector 266. The panel 262 may be, for example, a liquid crystal display (LCD), or an active-matrix organic light-emitting diode (AM-OLED), etc. The panel 262 may be implemented, for example, such that it is flexible, transparent, or wearable. The panel 262 may be configured as one module together with the touch panel 252. The hologram device 264 may show a three-dimensional image in the air using interferences of light. The projector 266 may project light onto a screen to display an image. The screen may be positioned, for example, inside or outside the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may convert a sound and an electric signal in dual directions. At least a partial element of the audio module 280 may be included, for example, in the I/O interface 150 illustrated in FIG. 1. The audio module 280 may process sound information input or output via, for example, a speaker 282, a receiver 284, an earphone 286, or a microphone 288, etc.

The camera module 291 is a device that may shoot a still image and a moving picture. According to an embodiment, the camera module 291 may include one or more image sensors (e.g., a front sensor or a rear sensor), a lens (not shown), an image signal processor (ISP) (not shown), or a flash (not shown) (e.g., an LED or xenon lamp).

The power management module 295 may manage the power supply of the electronic device 201. Though not shown, the power management module 295 may include, for example, a power management integrated circuit (PMIC), a charger integrated circuit (IC), or a battery or a battery or fuel gauge.

The PMIC may be mounted, for example, inside an integrated circuit or a SoC semiconductor. A charging method may be classified into a wired charging method and a wireless charging method. The charging IC may charge a battery and prevent overvoltage or overcurrent from being caused by a charger. According to an embodiment, the charging IC may include a charging IC for at least one of the wired charging method and the wireless charging method. The wireless charging method may be, for example, a magnetic resonance method, a magnetic induction method, or an electromagnetic wave method, etc., and may additionally include an additional circuit for wireless charging, for example, a circuit such as a coil loop, a resonance circuit, or a rectifier, etc.

The battery gauge may measure, for example, a remnant of the battery 296, a voltage, a current, or a temperature while charging. The battery 296 may store or generate electricity, and supply power to the electronic device 201 using the stored or generated electricity. The battery 296 may include, for example, a rechargeable battery or a solar battery.

The indicator 297 may display a specific state of the electronic device 201 or a portion thereof (e.g., the AP 210), for example, a booting state, a message state, or a charging state, etc. The motor 298 may convert an electric signal to mechanical vibration. Though not shown, the electronic device 201 may include a processor (e.g., a GPU) for supporting a mobile TV. The processor for supporting the mobile TV may process media data corresponding to standards, for example, such as digital multimedia broadcasting (DMB), digital video broadcasting (DVB), or a media flow, etc.

Figure 3:
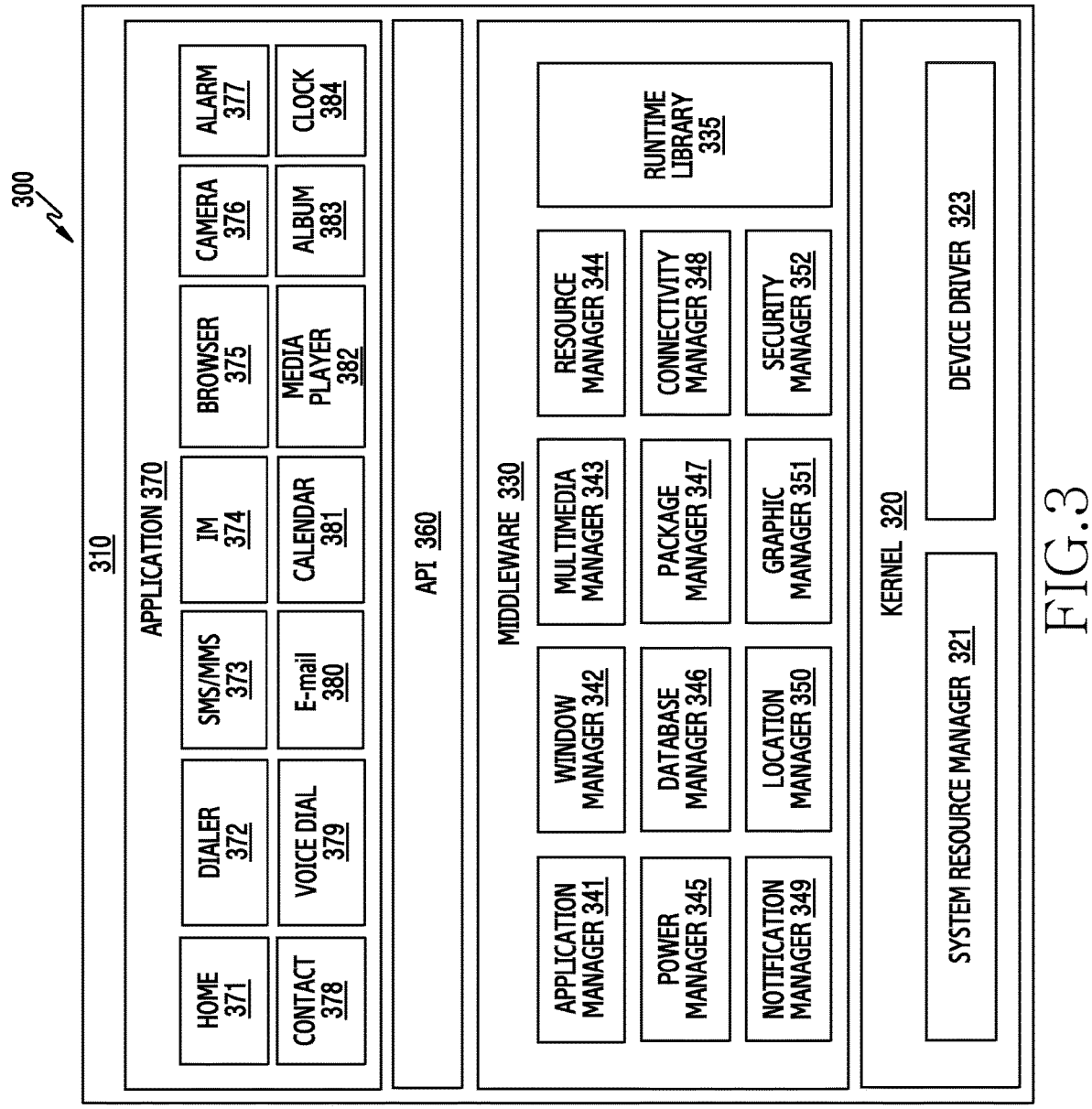
FIG. 3 is a diagram of an example of a program module, according to various embodiments.

FIG. 3 is a block diagram 300 of an example of a program module 310, according to various embodiments of the present disclosure.

According to an embodiment, the program module 310 (for example, the programs 140) may include an Operating System (OS) for controlling resources related to the electronic device (for example, the electronic device 100) and/or various applications (for example, the application programs 147) executed in the operating system. The operating system may be, for example, Android, iOS, Windows, Symbian, Tizen, Bada, or the like.

The programming module 310 may include a kernel 320, middleware 330, an API 360, and/or applications 370. At least some of the program module 310 may be preloaded in the electronic device or downloaded from the server.

The kernel 320 (for example, the kernel 141 of FIG. 1) may include, for example, a system resource manager 331 or a device driver 333. The system resource manager 331 may control, allocate, or collect the system resources. According to an embodiment, the system resource manager 331 may include a process management unit, a memory management unit, or a file system management unit. The device driver 333 may include, for example, a display driver, a camera driver, a Bluetooth driver, a shared-memory driver, a USB driver, a keypad driver, a WiFi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses to add new functions through a programming language while the application 370 is executed. The runtime library 335 may perform input/output management, memory management, or a function for an arithmetic function.

The application manager 341 may manage, for example, a life cycle of at least one of the applications 370. The window manager 342 may manage Graphical User Interface (GUI) resources used by a screen. The multimedia manager 343 may grasp formats required for the reproduction of various media files, and may perform an encoding or decoding of the media file by using a codec suitable for the corresponding format. The resource manager 344 may manage resources such as a source code, a memory, and a storage space of at least one of the applications 370.

The power manager 345 may operate together with a Basic Input/Output System (BIOS) to manage a battery or power and may provide power information required for the operation of the electronic device. The database manager 346 may generate, search for, or change a database to be used by at least one of the applications 370. The package manager 347 may manage the installation or the updating of applications distributed in the form of a package file.

The connectivity manager 348 may manage, for example, Wi-Fi or Bluetooth wireless connection. The notification manager 349 can display or notify of an event such as an arrival message, promise, proximity notification, and the like in such a way that does not disturb a user. The location manager 350 may manage location information of the electronic device. The graphic manager 351 may manage graphic effects to be provided to a user and user interfaces related to the graphic effects. The security manager 352 may provide all security functions required for system security or user authentication. According to an embodiment, when the electronic device (for example, electronic device 100) has a call function, the middleware 330 may further include a telephony manager for managing a voice call function or a video call function of the electronic device.

The middleware 330 may include a middleware module for forming a combination of various functions of the aforementioned components. The middleware 330 may provide modules specialized according to types of operating systems in order to provide differentiated functions. Further, the middleware 330 may dynamically remove some of the existing components or add new components.

The API 360 (for example, the API 145) is, for example, a set of API programming functions, and a different configuration thereof may be provided according to an operating system. For example, Android or iOS may provide one API set per platform, and Tizen may provide two or more API sets per platform.

The applications 370 (for example, the application programs 147) may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, clock 384, health care (for example, measure exercise quantity or blood sugar), or environment information (for example, atmospheric pressure, humidity, or temperature information).

According to an embodiment, the applications 370 may include an application (hereinafter, referred to as an "information exchange application" for convenience of the description) supporting information exchange between the electronic device (for example, the electronic device 100) and an external electronic device. The information exchange application may include, for example, a notification relay application for transferring predetermined information to an external electronic device or a device management application for managing an external electronic device.

For example, the notification relay application may include a function of transferring, to the external electronic device, notification information generated from other applications of the electronic device 100 (for example, an SMS/MMS application, an e-mail application, a health management application, or an environmental information application). Further, the notification relay application may receive notification information from, for example, a control device and provide the received notification information to the user. The device management application may manage (for example, install, delete, or update), for example, a function for at least a part of the external electronic device communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment, the applications 370 may include an application (for example, health management application) designated according to attributes of the external electronic device (for example, attributes of the electronic device such as the type of electronic device which corresponds to a mobile medical device). According to an embodiment, the applications 370 may include an application received from the external electronic devices (for example, the server or the electronic device). According to an embodiment, the applications 370 may include a preloaded application or a third party application which can be downloaded from the server. The names of the components of the program module 310 according to the embodiment illustrated in FIG. 3 may vary according to the type of operating system.

According to various embodiments, at least some of the programming module 310 may be implemented in software, firmware, hardware, or a combination of two or more thereof. At least some of the programming module 310 may be implemented (for example, executed) by, for example, the processor (for example, the application program). At least some of the programming module 310 may include, for example, a module, program, routine, sets of instructions, or process for performing one or more functions.

According to various embodiments, an electronic device may include: a display to acquire and output image data; and a processor to process to store the outputted image data, detect an input on the image data, and generate preview data related to a location corresponding to an input satisfying a condition.

According to various embodiments, the processor may be configured to generate the preview data based on a condition related to at least one of a number of times of touch input, generation of a layer, and a focus area.

According to various embodiments, in response to detecting a touch input satisfying a pre-defined number of times, the processor may be configured to generate preview data corresponding to a predetermined area based on a location where the touch input is detected in the image data.

According to various embodiments, in response to detecting an input which outputs a layer, the processor may be configured to generate preview data corresponding to a predetermined area including the layer in the stored image data.

According to various embodiments, in response to detecting an input which sets a focus area, the processor may be configured to generate preview data corresponding to a predetermined area including the focus area in the stored image data.

According to various embodiments, in response to continuously detecting a first input for designating a focus area and a second input for designating a preview data area, the processor may be configured to generate preview data corresponding to a predetermined area including an area corresponding to the second input to the stored image data.

According to various embodiments, in response to detecting a plurality of inputs satisfying a condition, the processor may be configured to output location information corresponding to each input and generate preview data related to a location selected by an input.

According to various embodiments, in response to detecting a plurality of inputs satisfying a condition, the processor may be configured to generate preview data based on a section in which the input is detected.

According to various embodiments, the preview data on the section in which the input is detected may include data for reproducing a plurality of image frames corresponding to the section in which the input is detected.

Figure 4:
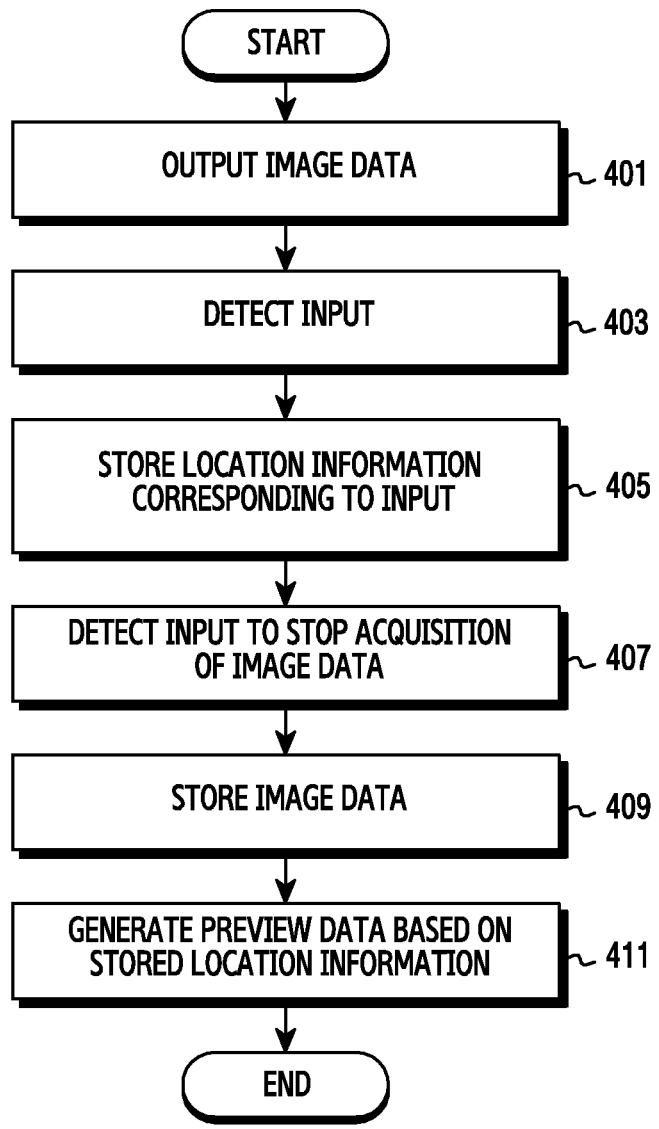
FIG. 4 is a flowchart of an example of a process, according to various embodiments.

FIG. 4 is a flowchart of an example of a process, according to various embodiments.

According to various embodiments, the electronic device may generate image data outputted to a screen as data of a storable form, and generate preview data regarding the generated data. According to an embodiment, the image data may include a still image or video and the preview data may include a thumbnail that is generated based on the still image or at least one frame of the video. According to various embodiments, the thumbnail may be a still image having lower resolution and/or size than the still image or video frame. Additionally or alternatively, the preview data may include a video that is generated based on two or more frames from the image data.

According to various embodiments, in operation 401, the electronic device may acquire and output image data. According to an embodiment, the image data may be acquired through a camera and outputted on the display of the electronic device. According to another embodiment, the image data may be a screen of an application that is executed by the electronic device.

In operation 403, the electronic device may detect a user's input, while outputting the image data. The input may be one for controlling an output screen and may be at least one of a touch input, a voice input, and a hardware button input.

In operation 405, the electronic device may store location information corresponding to the input satisfying a condition. The location information may be related to a frame of an image outputted to the screen or at least part of the frame.

According to various embodiments, the condition may be related to at least one of the number of touches (or other gestures) that are part of the input, a volume of the input, and the generation of a layer.

For example, when a touch input including a predetermined number of touches is detected, the electronic device may store location information associated with at least part of a frame in which the touch input is detected. In another example, when speech input having a pre-defined voice volume is detected, the electronic device may store information related to a frame which is outputted when the voice input is detected. In another example, when a particular hardware button is pressed, the electronic device may store information related to a frame which is outputted when the button input is detected. In another example, when an input for generating a pre-defined layer is detected, the electronic device may store location information related to the location of the generated layer.

In operation 407, the electronic device may detect an input for stopping the acquisition of image data, and, as in operation 409, the electronic device may store the image data. According to an embodiment, the electronic device may store image data which includes a sequence of frames starting with a frame displayed when the user's input is detected at operation 403 and ending with a frame displayed when the input for stopping the acquisition is detected.

In operation 411, the electronic device may generate preview data based on stored location information. According to an embodiment, the electronic device may generate preview data including a predetermined area that is selected based on stored location information. For example, the electronic device may generate preview data of a predetermined size with reference to a location where a predetermined number of touches are detected, a location of a generated layer, a location associated with a detected voice input, and a location associated with a detected button input.

Figure 5:
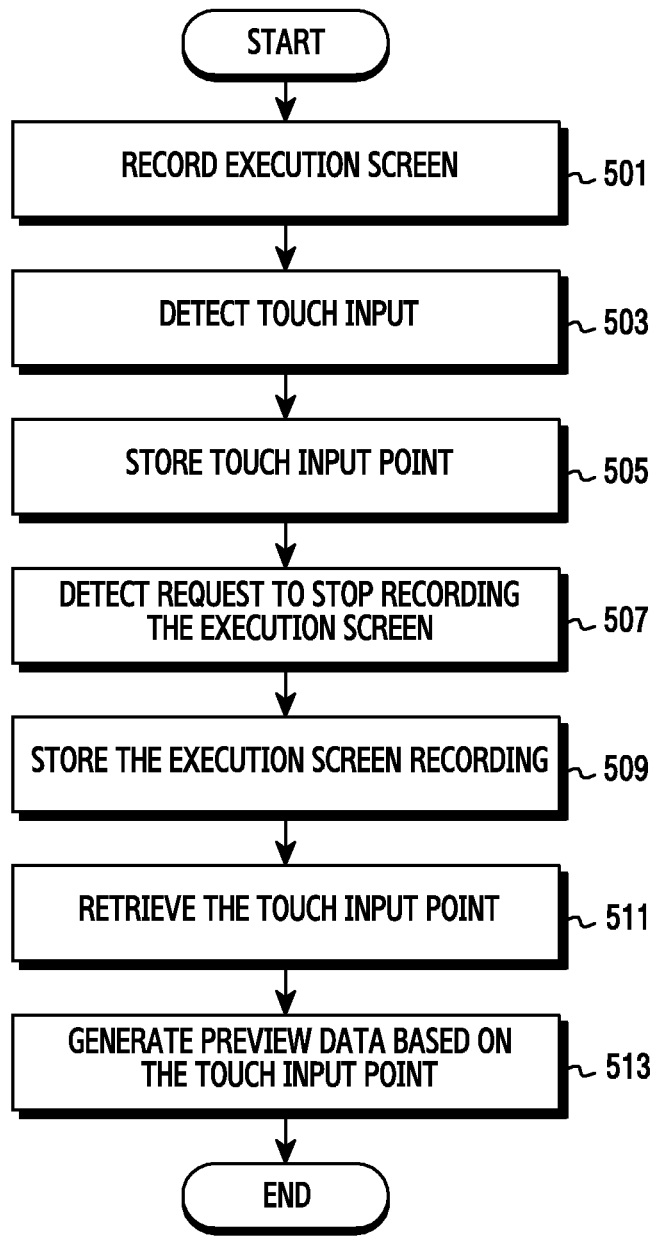
FIG. 5 is a flowchart of an example of a process, according to various embodiments.

FIG. 5 is a flowchart of an example of a process, according to various embodiments.

Referring to FIG. 5, the electronic device may generate preview data related to a location where a touch input is detected.

In operation 501, the electronic device may record an execution screen. The execution screen may include an execution screen of at least one application which may be executed in the electronic device. For example, the electronic device may record a screenshot (or video) of the screen of a game that is being executed.

In operation 503, the electronic device may detect a touch input while recording the execution screen.

In operation 505, the electronic device may store a touch input point and the number of times that the user touches the touch input point. According to an embodiment, the electronic device may identify inputs continuously detected during a predetermined time from the point of time when the touch input is detected.

In operation 507, the electronic device may detect a request to stop recording the screen, and, in operation 509, the electronic device may store the recording of the screen. For example, the electronic device may output a menu having a "stop recording" button (or another input component). When the "stop recording" button is pressed, the electronic device may store a video of the execution screen starting with a frame (e.g., screenshot) displayed when the recording of the execution screen is started and ending with a frame (e.g., another screenshot) displayed when the request to stop the screen recording is detected.

In operation 511, the electronic device may identify a touch input point corresponding to the number of times of inputting satisfying a condition from among stored touch input points.

In operation 513, the electronic device may generate preview data of a predetermined size with reference to the touch input point corresponding to the number of times of inputting satisfying the condition.

According to an embodiment, when a plurality of touch input points corresponding to the number of touches satisfying the condition are identified, the electronic device may output information on the respective input points and then generate preview data related to a touch input point selected by the user. According to another embodiment, when the plurality of touch input points corresponding to the number of times of inputting satisfying the condition are identified, the electronic device may generate preview data related to a location where the touch input is detected the largest number of times.

Figure 6:
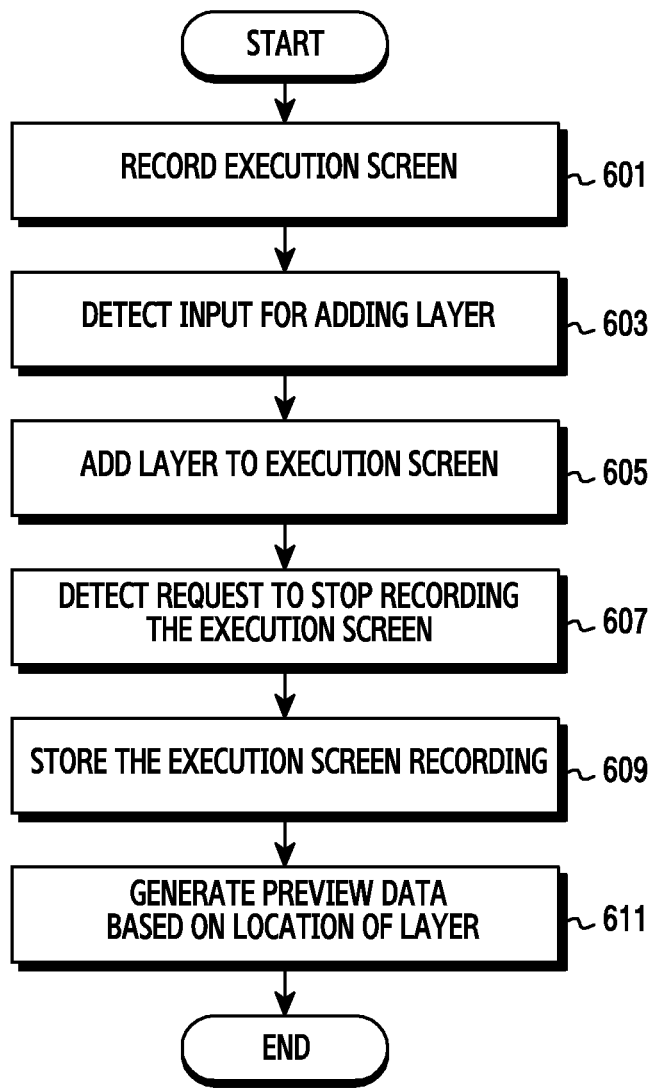
FIG. 6 is a flowchart of an example of a process, according to various embodiments.

FIG. 6 illustrates a flowchart of an example of a process, according to various embodiments.

Referring to FIG. 6, the electronic device may generate preview data related to a location of a layer that is generated while image data is being stored.

In operation 601, the electronic device may begin recording an execution screen. The execution screen may include an execution screen on at least one application which may be executed by the electronic device.

In operation 603, the electronic device may detect an input for adding a layer to the recording the execution screen. According to an embodiment, the layer may include an image that is superimposed over one of more frames in the execution screen recording. For example, the layer may include an image acquired through a camera. In another example, the layer may include pre-defined data (for example, an image, text, etc.) through the layer. For example, the layer may include a schedule notification, etc. which may be displayed through the layer while the execution screen is being recorded. In some embodiments, the layer may be superimposed over a portion (e.g., mid-portion) of the execution screen recording.

In operation 605, the electronic device may output the layer on the execution screen in response to an input.

In operation 607, the electronic device may detect a request to stop the screen recording, and, in operation 609, the electronic device may store the screen recording.

In operation 611, the electronic device may generate preview data based on the location of the layer on the execution screen. According to an embodiment, the electronic device may generate preview data of a predetermined size with reference to the location of the layer when the screen recording is stopped. According to another embodiment, the electronic device may change the location of the outputted layer in response to an input, and generate preview data of a predetermined size with reference the changed location of the layer.

Figure 7:
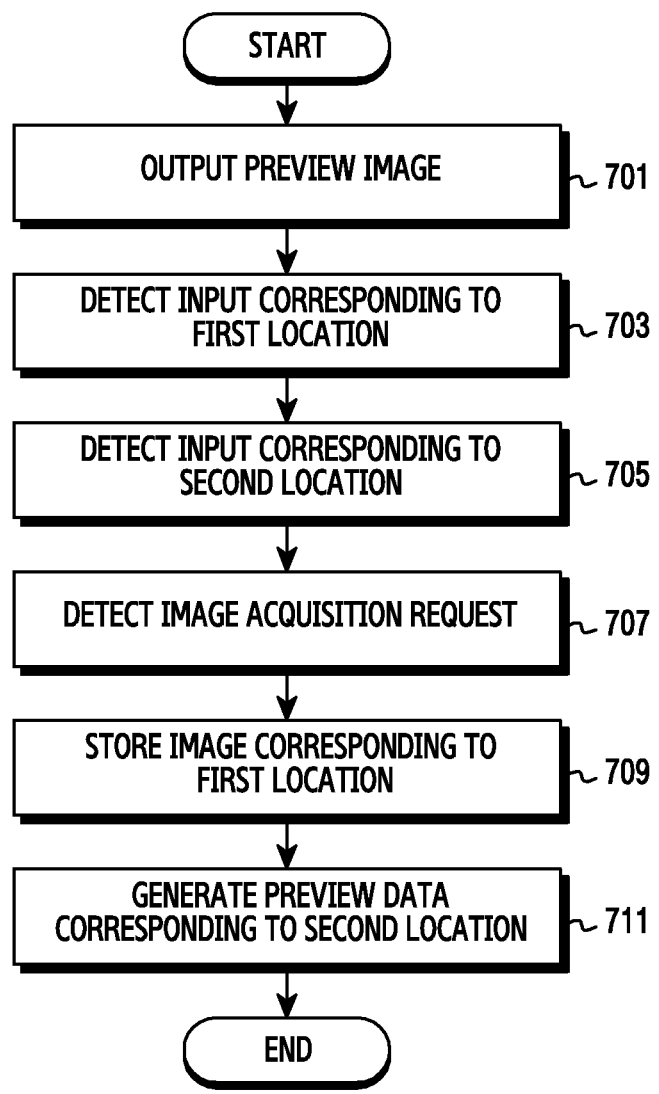
FIG. 7 is a flowchart of an example of a process, according to various embodiments.

FIG. 7 is a flowchart of an example of a process, according to various embodiments.

The electronic device may generate preview data related to a location where an input for defining a focus is detected when acquiring image data.

According to various embodiments, as in operation 701, the electronic device may output a preview image.

According to various embodiments, as in operation 703, the electronic device may detect an input corresponding to a first location. According to an embodiment, the first location may be in an area which defines a focus in the preview image.

According to various embodiments, as in operation 705, the electronic device may detect an input corresponding to a second location. According to an embodiment, the second location may be an area which defines preview data in the preview image. According to various embodiments, the input corresponding to the second location may be detected within a predetermined time after the input corresponding to the first location has been detected.

According to various embodiments, as in operation 707, the electronic device may detect an image acquisition request, and, as in operation 709, the electronic device may store an image corresponding to the first location. For example, the electronic device may acquire and store an image which is focused onto the first location.

According to various embodiments, as in operation 711, the electronic device may generate preview data of a predefined size with reference to the second location.

In the process of FIG. 7, the preview data is generated by continuously detecting the input on the area for defining the preview data, which is distinguished from the input for defining the focus. However, according to various embodiments, the electronic device may generate preview data associated with a focus area based on the input for defining the focus. For example, when the image acquisition request is detected after the input corresponding to the first location is detected, the electronic device may generate image data corresponding to the first location and preview data.

Figure 8:
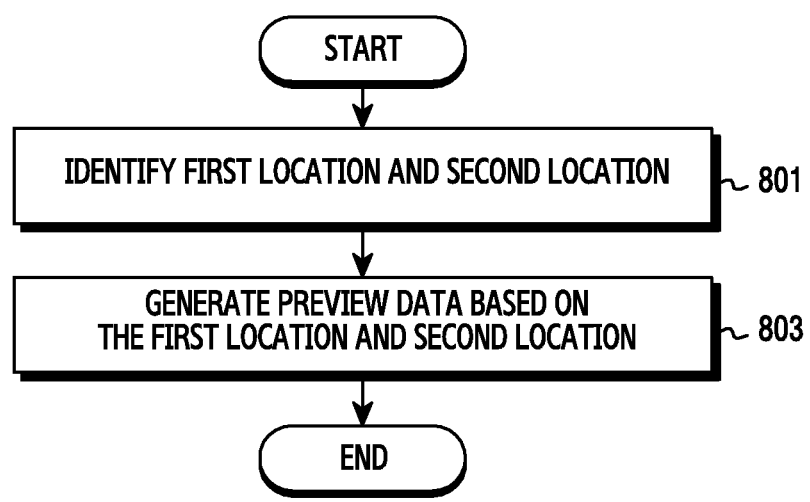
FIG. 8 is a flowchart of an example of a process, according to various embodiments.

FIG. 8 is a flowchart of an example of a process, according to various embodiments.

Referring to FIG. 8, the electronic device may generate preview data using an image frame satisfying a condition. According to various embodiments, the condition may be related to at least one of the number of times of inputting, a voice volume, and generation of a layer.

In operation 801, the electronic device may identify a first location and a second location of image data satisfying a preview data condition. According to an embodiment, the first location and the second location may be a location of a first frame and a location of a second frame, which satisfy a condition, from among a plurality of image frames. According to another embodiment, the first location and the second location may be a first area and a second area may be part of the same frame.

In operation 803, the electronic device may generate preview data based on a sequence of frames starting with a frame associated with the first location and ending at a frame associated with the second location.

According to various embodiments, the electronic device may generate a single preview data with a plurality of frames existing between the frame of the first location and the frame of the second location. For example, the electronic device may generate image data representing a motion using a plurality of frames, and may use the image data as preview data.

Figure 9:
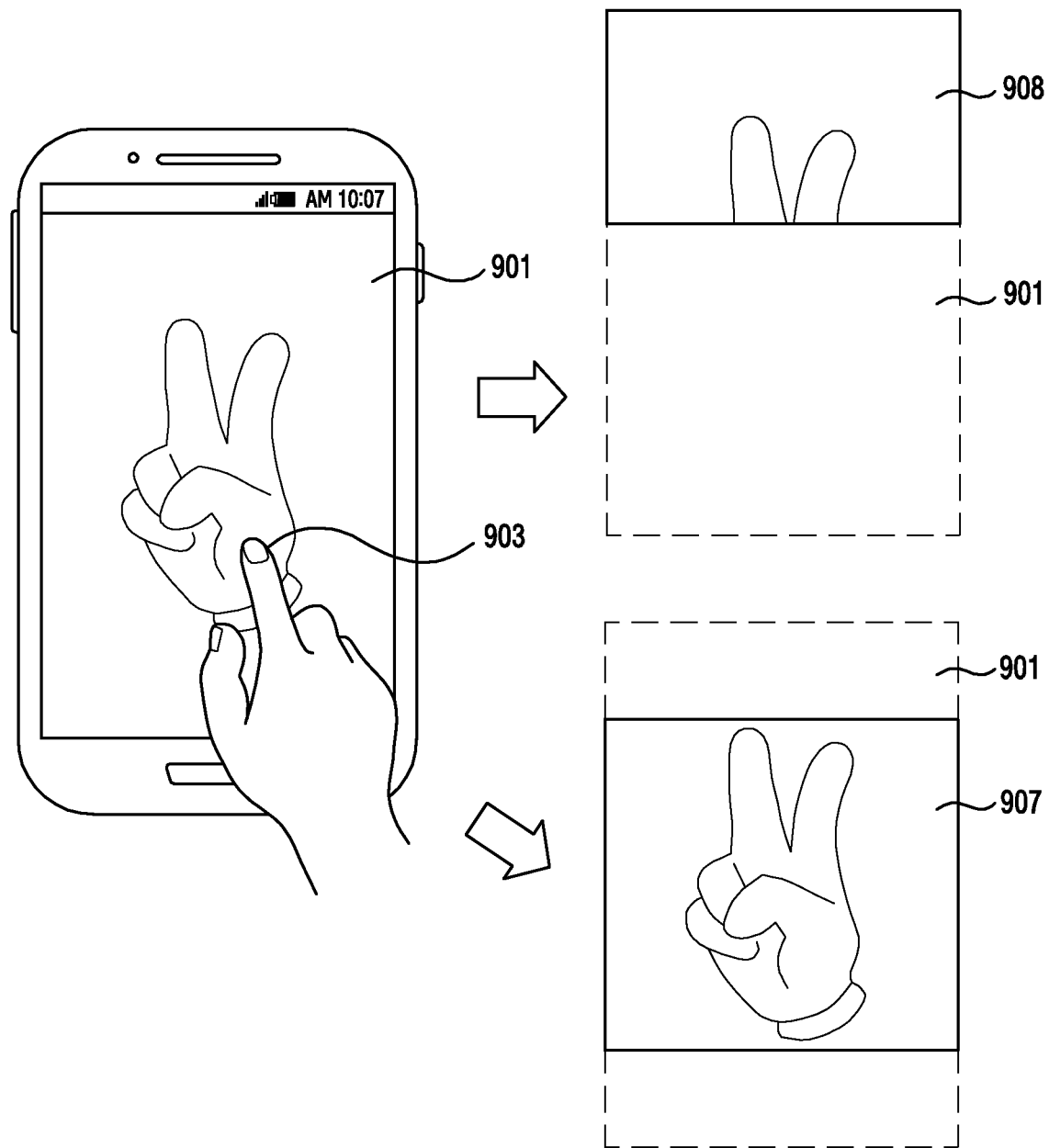
FIG. 9 is a diagram illustrating the operation of a process for generating preview data, according to various embodiments.

FIG. 9 is a diagram illustrating the operation of a process for generating preview data, according to various embodiments.

Referring to FIG. 9, the electronic device may generate preview data related to a location where a touch input is detected while image data is being stored.

According to an embodiment, the electronic device may store image data, and generate a preview of the image data. For example, the electronic device may generate the preview based on respective portions of one or more frames of the image data (e.g., the top or middle portion of each of the frames). The respective portions may be specified via a touch input that is performed while the image data is being rendered. The touch input may select a particular portion of one or more frames of the image data (e.g., a top portion, a middle portion, etc.) which is to be used in generating the preview data. For example, the touch input may specify that only the respective top portions of one or more frames of the image data are to be used in generating the preview data.

According to various embodiments, the electronic device may generate preview data of a predetermined size with reference to a location where a touch input on the outputted image is detected.

FIG. 9 illustrates a comparison of two possible ways in which an electronic device can operate, according to various embodiments. For example, when outputted image data is stored, the electronic device may generate preview data with reference to the upper end of the image data 901 thus generating preview data 908 including only a part of an object of the image data (for example, a finger). However, alternatively, the electronic device may generate preview data 907 with reference to an object of the image data 901 where a touch input 903 is detected.

Figure 10:
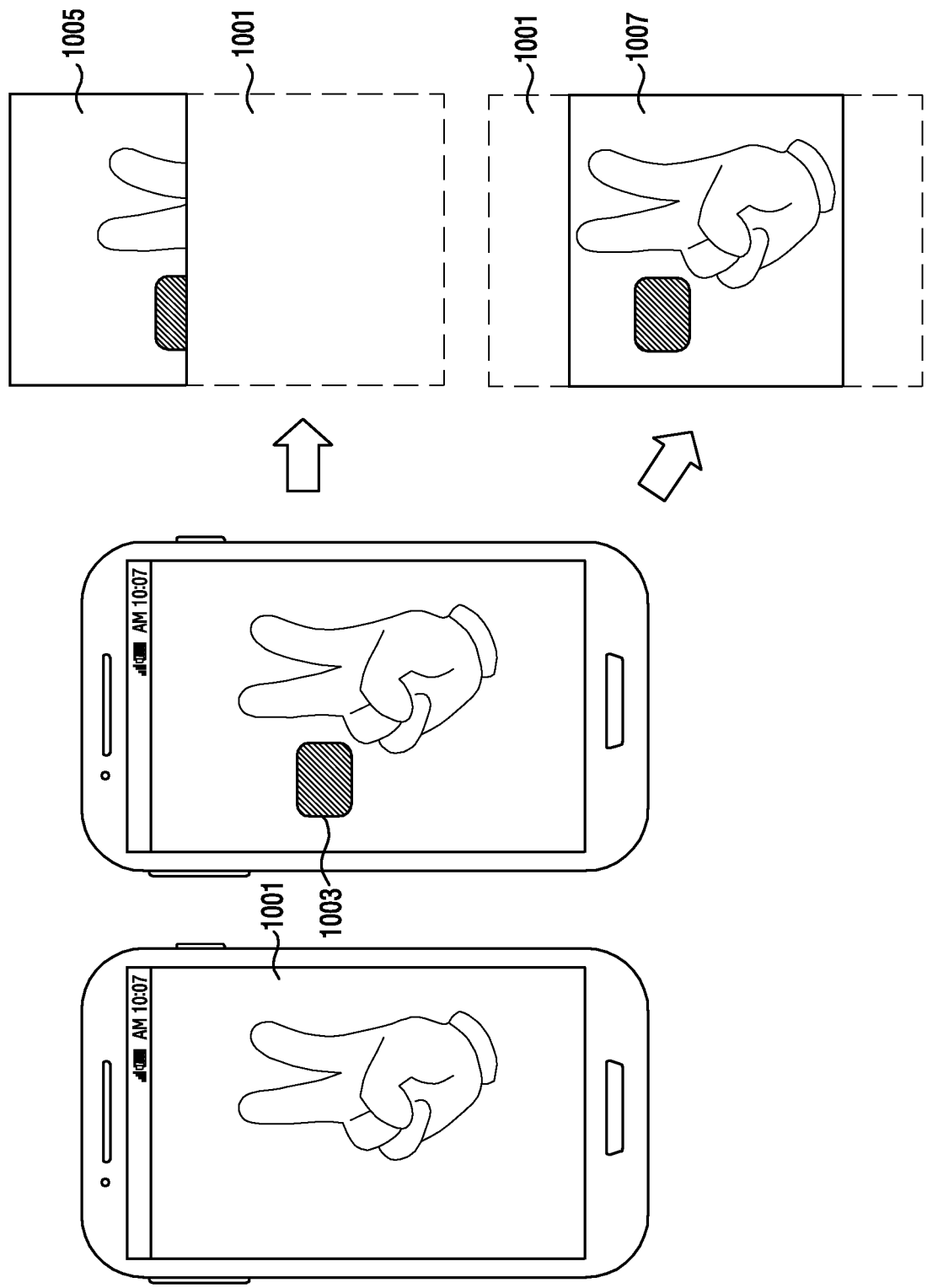
FIG. 10 is a diagram illustrating the operation of a process for generating preview data, according to various embodiments.

FIG. 10 is a diagram illustrating the operation of a process for generating preview data, according to various embodiments.

Referring to FIG. 10, the electronic device may generate preview data related to a location of a layer generated in the middle of storing image data.

According to various embodiments, the electronic device may generate a layer 1003 on image data 1001 in response to a user input in the middle of storing the image data 1001. The layer may be a screen which is superimposed on the image data. According to an embodiment, the electronic device may output pre-defined data through the generated layer. For example, the layer may include an image that is captured a camera, text data, and/or image data pre-defined by the user.

According to various embodiments, the electronic device may generate preview data of a predetermined size with reference to the location of the generated layer in the middle of storing the image data.

FIG. 10 illustrates two possible ways in which the electronic device can operate. For example, when outputted image data is stored, the electronic device may generate preview data with reference to the upper end of the image data 1001 and thus generating preview data 1005 including only a part of an object of the image data (for example, a finger). However, alternatively, the electronic device may generate preview data 1007 with reference to the location of the layer. In other words, according to various embodiments, the preview data may be generated based on the location of the layer rather than on the location of the upper end of the image data.

Figure 11:
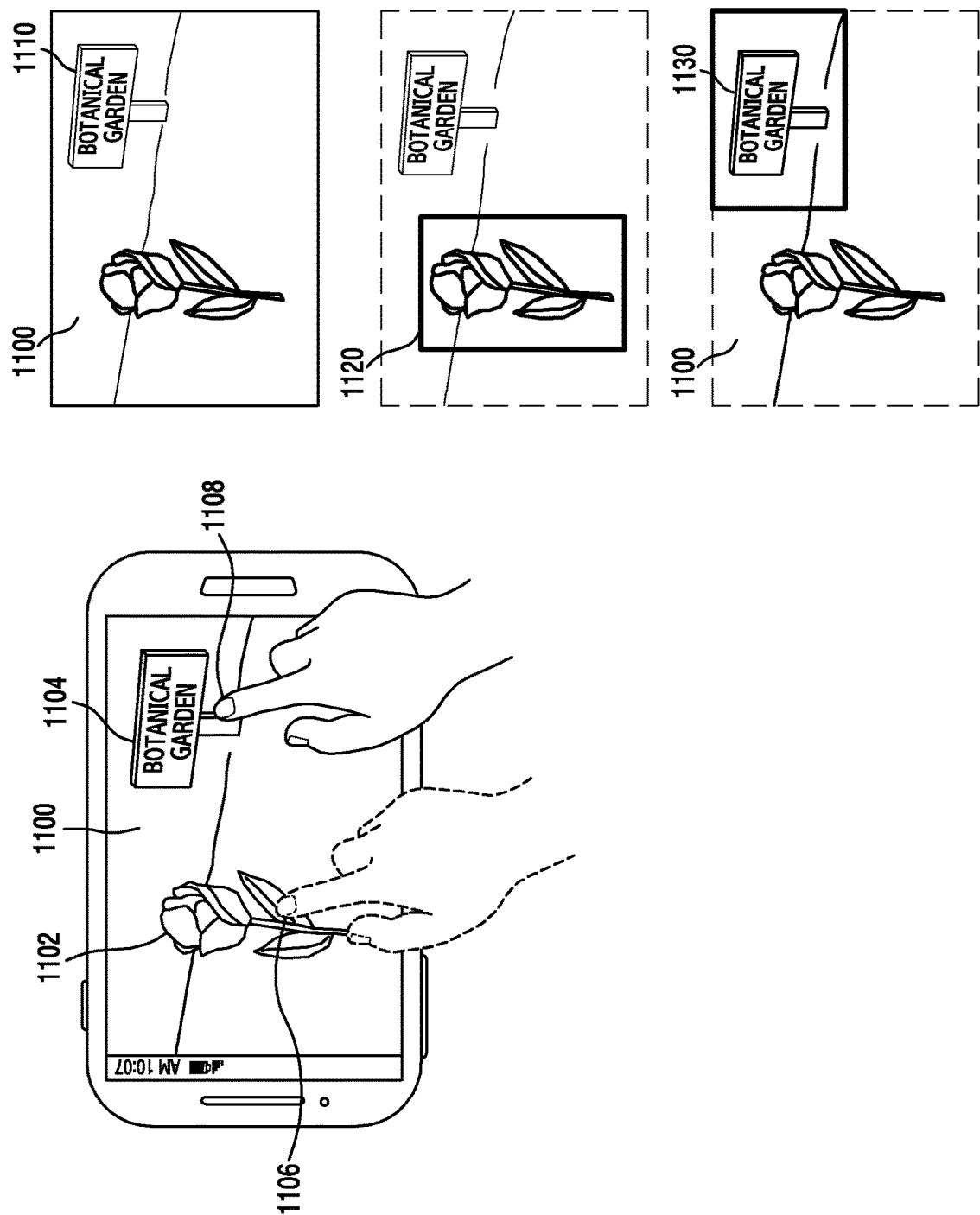
FIG. 11 is a diagram illustrating the operation of a process for generating preview data, according to various embodiments.

FIG. 11 is a diagram illustrating the operation of a process for generating preview data, according to various embodiments.

Referring to FIG. 11, the electronic device may generate preview data related to a location where an input for defining a focus is detected when acquiring image data.

According to various embodiments, the electronic device may detect a user's input when outputting a preview screen 1100. According to an embodiment, the input may include a gesture 1106 specifying a focus 1102 or a gesture 1108 specifying a location 1104 of preview data.

According to various embodiments, the electronic device may generate preview data of a predetermined size based on an input performed on the preview screen 1100.

FIG. 11 illustrates the electronic device acquiring image data in response to detecting the first gesture 1106 for defining the focus on the preview screen, and the second gesture 1108 for defining the location of the preview data. That is, as shown in FIG. 11, in response to detecting the first gesture performed on an object of the preview screen (for example, a flower), the electronic device may acquire image data 1100 in which a focus is formed in response to the first gesture and there is no focus in the other background screen 1110.

Furthermore, FIG. 11 illustrates the preview data which is generated based on the first gesture or the second gesture According to an embodiment, the electronic device may generate preview data 1120 based on the location where the first gesture is detected as shown in FIG. 11. For example, the electronic device may generate preview data including an object where a focus is formed.

According to another embodiment, the electronic device may generate preview data 1130 based on the location where the second gesture is detected as shown in FIG. 11. For example, the electronic device may generate preview data including an object positioned at the location where the second input is detected (for example, a signboard). In other words, according to various embodiments the electronic device may detect a touch that is performed on a given image frame. Next, the electronic device may identify an object that is positioned at the location where the touch is performed. And finally, the electronic device may extract a portion of the image that includes the entire object and generate the preview data based on the extracted portion.

Figure 12:
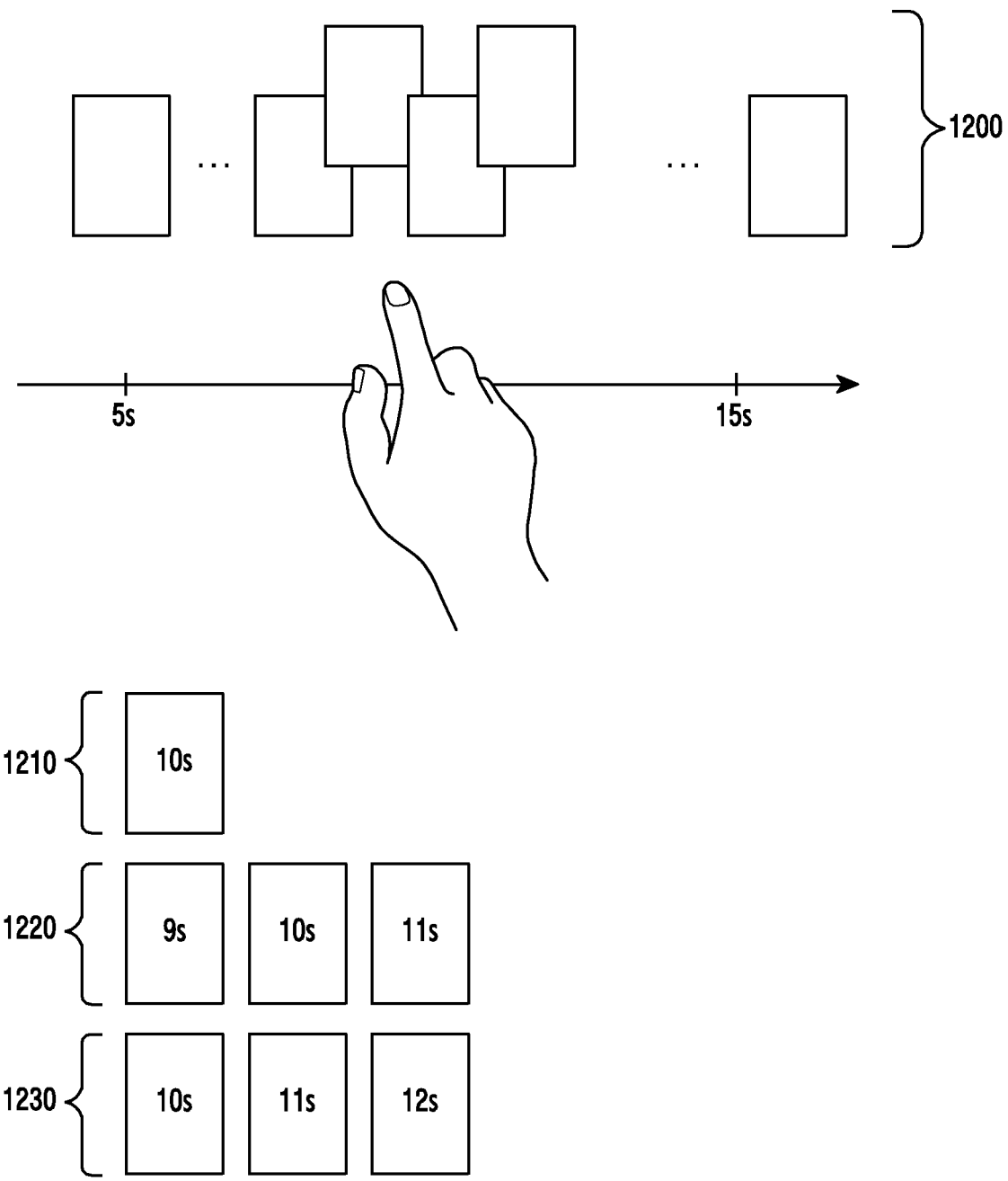
FIG. 12 is a diagram illustrating the operation of a process for generating preview data, according to various embodiments.

FIG. 12 is a diagram illustrating the operation of a process for generating preview data, according to various embodiments.

According to various embodiments, the electronic device may generate image data using a plurality of image frames 1200 outputted to a screen.

According to an embodiment, the electronic device may generate preview data based on an image frame satisfying a given condition.

For example, the condition may be related to the number of touches that are part of an input, and the electronic device may store an indication of a time when the input is detected, and then generate preview data based on an image frame associated with the time.

For example, the electronic device may output image frames for 15 seconds as shown in FIG. 12, and may detect a touch input in the 10th second of the image frame output.

According to an embodiment, the electronic device may generate preview data 1210 based on an image frame corresponding to the point of time when the touch input is detected (for example, 10 seconds).

According to another embodiment, the electronic device may generate preview data 1220 based on image frames in a predetermined section (for example, a section between −1 second and +1 second) with reference to the point of time when the touch input is detected (for example, 10 seconds).

According to another embodiment, the electronic device may generate preview data 1230 based on image frames in a predetermined section (for example, a section within +2 seconds) from the point of time when the touch input is detected (for example, 10 seconds).

Figure 13:
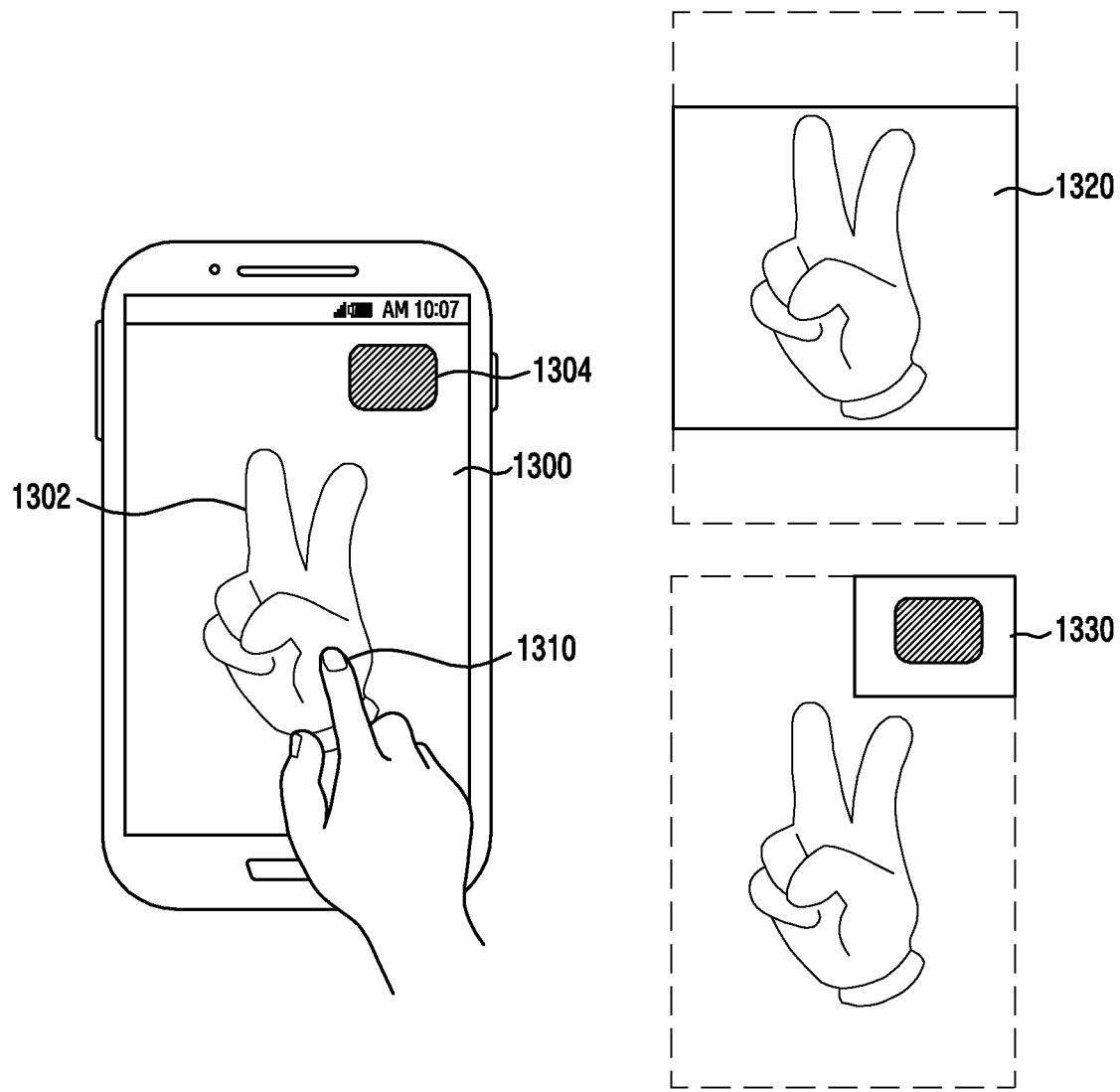
FIG. 13 is a diagram illustrating the operation of a process for generating preview data, according to various embodiments.

FIG. 13 is a diagram illustrating the operation of a process for generating preview data, according to various embodiments.

Referring to FIG. 13, the electronic device may generate preview data related to the number of times a touch input is detected while image data is being stored.

According to an embodiment, the electronic device may define the number of times of touch inputs as a plurality of ranks, and generate preview data of a different area according to a rank corresponding to the number of times the touch input is detected.

For example, the electronic device may define the number of times of touch input as a first rank and a second rank. The electronic device may define the number of times of touch input as more ranks. According to an embodiment, the number of times of touch input of the first rank may be less than the number of times of touch input of the second rank. Alternatively, the number of times of touch input of the first rank may be greater than the number of times of touch input of the second rank.

According to various embodiments, the electronic device may output image data 1300 including a layer 1304. In this case, when a touch input 1310 satisfying the first rank is detected, the electronic device may generate preview data 1320 based on the location where the touch input is detected. For example, preview data of a predetermined size including an object 1302 of the location where the touch input is detected may be generated.

Furthermore, when a touch input 1310 satisfying the second rank is detected, the electronic device may generate preview data 1330 based on the location of the layer. For example, preview data of a predetermined size including the layer 1304 may be generated.

Put differently, according to various embodiments, the respective portion of one or more frames in the image data that are used in generating the preview data may be specified based on the number of touches that are performed on the screen of the electronic devices. For example, if two touches are performed on the screen, the preview data may be generated based on the location where the touches are performed. Alternatively, if three touches are performed, the preview data may be generated based on the location where a layer is superimposed on the image data.

Figure 14:
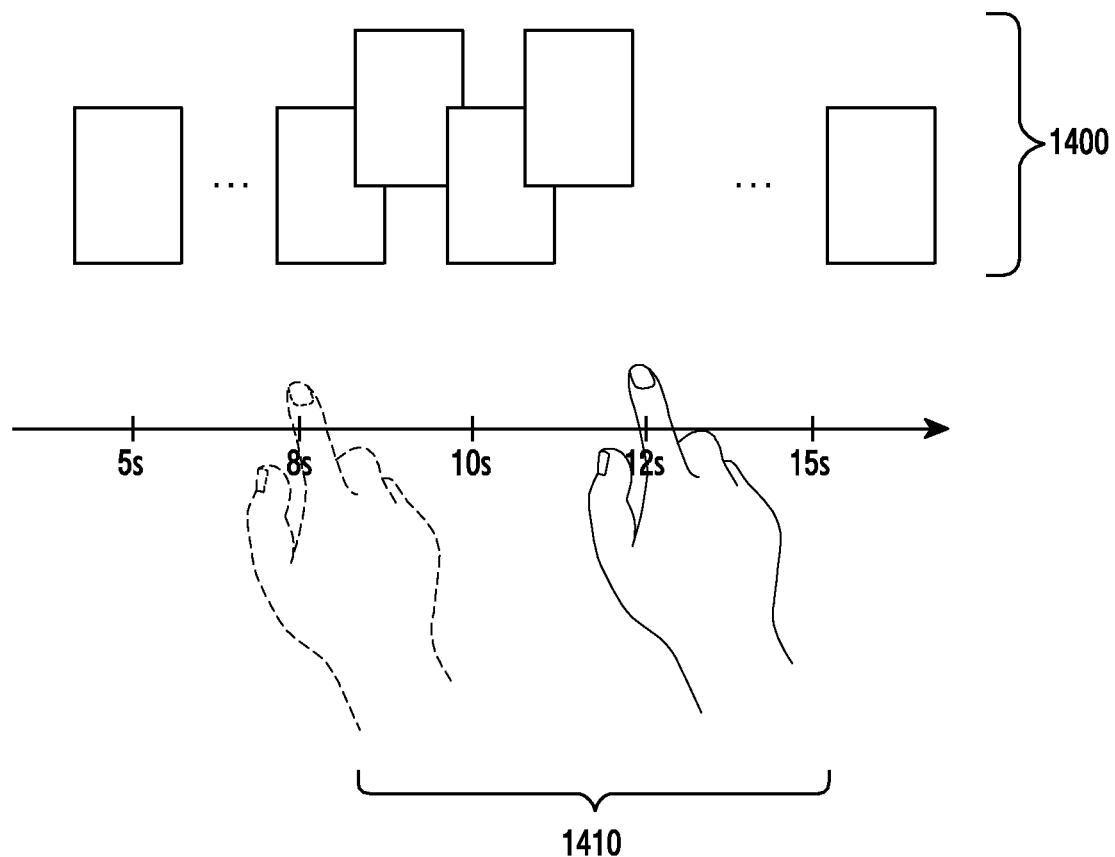
FIG. 14 is a diagram illustrating the operation of a process for generating preview data, according to various embodiments.
Figure 14:
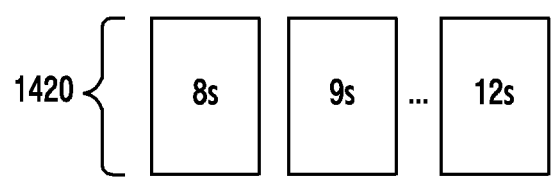

FIG. 14 is a diagram illustrating the operation of a process for generating preview data, according to various embodiments.

According to various embodiments, the electronic device may generate image data using a plurality of image frames 1400 outputted to a screen.

According to an embodiment, the electronic device may generate preview data based on an image frame satisfying a condition from among the outputted image frames.

For example, the condition may be related to a touch input, and the electronic device may generate preview data based on an image frame when the touch input is detected.

According to various embodiments, the electronic device may identify a plurality of points of time when the touch input is detected.

For example, as shown in FIG. 14, the electronic device may output image frames for 15 seconds, and may detect a touch input 1410 in 8 seconds and 12 seconds after the image frames have been outputted.

According to various embodiments, the electronic device may generate preview data based on image frames outputting in a section between the points of time when the touch input is detected. For example, the electronic device may generate a single image data based on image frames 1410 during a time between 8 seconds and 12 seconds in which the touch input is detected, and may use the single image data as preview data. The single image data may be data for reproducing the image frames in the section where the touch input is detected (for example, between 8 seconds and 12 seconds).

In other words, according to various embodiments, the user may select a sequence of frames in the image data for use in generating the preview data by performing a first touch that selects the starting frame of the sequence and a second touch that selects the ending frame of the sequence. The first and second touch may be performed during playback of the image data and/or while the image data is being recorded.

According to various embodiments, an operation method of an electronic device may include: outputting image data including at least one frame; identifying a location where an input is detected in the outputted image data; and generating preview data on the image data based on a location of the image data satisfying a condition.

According to various embodiments, the condition may include a condition related to at least one of a number of times of touch input, generation of a layer, and a focus area.

According to various embodiments, the generating the preview data may include, in response to detecting a touch input satisfying a pre-defined number of times, generating preview data corresponding to a predetermined area based on the location where the touch input is detected in the image data.

According to various embodiments, the generating the preview data may include, in response to detecting an input which outputs a layer, generating preview data corresponding to a predetermined area including the layer in the stored image data.

According to various embodiments, the generating the preview data may include, in response to detecting an input which sets a focus area, generating preview data corresponding to a predetermined area including the focus area in the stored image data.

According to various embodiments, the generating the preview data may include, in response to continuously detecting a first input for designating a focus area and a second input for designating a preview data area, generating preview data corresponding to a predetermined area including an area corresponding to the second input.

According to various embodiments, the generating the preview data may include: in response to detecting a plurality of inputs satisfying a condition, outputting location information corresponding to each input; and generating preview data related to a location selected by an input.

According to various embodiments, the generating the preview data may include, in response to detecting a plurality of inputs satisfying a condition, generating preview data including a plurality of frames corresponding to a section in which the input is detected.

According to various embodiments, the layer may include an output area which is outputted in a floating form on the outputted image data.

The term "module" used in the present disclosure may refer to, for example, a unit including a combination of one or more hardware, software, or firmware. The term "module" may be interchangeably used with a term such as "unit," "logic," "logical block," "component," or "circuit," etc. The term "module" may refer to a minimum unit of an integrally configured part or a portion thereof. The term "module" may refer to a minimum unit performing one or more functions or a portion thereof. The term "module" may refer to a device that is mechanically or electronically implemented. For example, a "module" according to the present disclosure may include at least one of an Application-Specific Integrated Circuit (ASIC) chip, a Field-Programmable Gate Array (FPGA), or a programmable-logic device which are known, or will be developed in the future, and performing certain operations.

According to an embodiment of the present disclosure, at least a portion of an apparatus (e.g., modules or functions thereof) or a method (e.g., steps) according to the present disclosure may be implemented as an instruction stored in a non-transitory computer-readable storage media, for example, in the form of a programming module. An instruction, when executed by one or more processors (e.g., the processor 120), may allow the one or more processors to perform a function corresponding to the instruction. The non-transitory computer-readable storage media may be, for example, the memory 130. At least a portion of a programming module may be implemented (e.g., executed) by, for example, the processor 120. At least a portion of the programming module may include, for example, a module, a program, a routine, sets of instructions, or a process, etc. for performing one or more functions.

The non-transitory computer-readable storage media may include a hard disk, a magnetic media such as a floppy disk and a magnetic tape, a Compact Disc Read Only Memory (CD-ROM), optical media such as a Digital Versatile Disc (DVD), magneto-optical media such as a floptical disk, and a hardware device configured for storing and performing a program instruction (e.g., a programming module) such as a Read Only Memory (ROM), a Random Access Memory (RAM), a flash memory, etc. Also, the program instruction may include not only a machine language code generated by a compiler but also a high-level language code executable by a computer using an interpreter, etc. The above-described hardware device may be configured to operate as one or more software modules in order to perform an operation of the present disclosure, and vice versa.

A module or a programming module according to the present disclosure may include at least one of the above-described elements, omit a portion thereof, or further include additional other elements. Operations performed by a module, a programming module, or other elements according to the present disclosure may be executed in a sequential, parallel, or heuristic method. Also, a portion of the operations may be executed in a different sequence, omitted, or other operations may be added.

For example, the method for controlling and the electronic device thereof according to various embodiments of the present disclosure generates preview data based on an input method on an output screen, and exactly provides information related to stored data.

Also, an embodiment of the present disclosure disclosed in the present disclosure and accompanying drawings merely suggest certain examples so as to easily describe the technological content of the present disclosure and help in the understanding of the present disclosure, and are not intended to limit the scope and spirit of the present disclosure. Accordingly, it should be understood that the scope of the present disclosure includes all modifications or changes drawn on the basis of the technological scope and spirit of the present disclosure, besides the embodiments disclosed herein, as defined by the appended claims and their equivalents.

FIGS. 1-14 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples. As used throughout the disclosure, the term "gesture" may refer to a touch, a sliding gesture, a flicking gesture, and or any other suitable type of input. According to aspects of the disclosure, touches that are performed on different user interface components (or in different locations of a touchscreen) may be considered to be different gestures.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:
1. An electronic device comprising:
a memory storing instructions;
a display; and
at least one processor, coupled to the display, configured to execute the stored instructions to:
  display a preview image being acquired by a camera module of the electronic device, the preview image including simultaneous display of a first object and a second object;
  after displaying the preview image including simultaneous display of the first object and the second object, detect a first touch input to the first object, followed by a second touch input to the second object, wherein:
    in response to detecting the first touch input, a focus is formed on the first object as to identify, from the preview image, the first object, and
    the second touch input is detected to the preview image disposed on the second object, and is received within a predesignated time from a time at which the first touch input is detected;
  in response to detecting the second touch input, determine a partial area of the preview image, wherein the partial area includes an entirety of the second object, excludes an entirety of the first object, and is less than an entire area of the preview image;

in response to receiving a capture command for the preview image, store a current image of the preview image focused on the first object; and after storing the current image responsive to the capture command, generate a thumbnail image including the partial area less than the entire area of the preview image, and including the second object.

2. The electronic device of claim 1, wherein the at least one processor is configured to:
determine at least one frame corresponding to a reception timing of at least one touch input among plurality of frames of the preview image, and
display the thumbnail image based on the determined at least one frame.

3. The electronic device of claim 2,
wherein the at least one processor is configured to determine the thumbnail image based on a reception location of the at least one touch input, and
wherein when the focus is formed on the first object responsive to the first touch input, no focus is formed on a background screen portion of the preview image, the background screen portion including the second object.

4. The electronic device of claim 2,
wherein the thumbnail image is a moving image including the at least one frame in which the at least one touch input is detected.

5. The electronic device of claim 1,
wherein the at least one processor is configured to:
identify a first location of the first touch input and a second location of the second touch input, and
determine the partial area including both the first location and the second location.

6. The electronic device of claim 1,
wherein the at least one processor is further configured to:
detect an input for generating a layer of an image superimposed on a screen, and
determine a thumbnail image including the layer of an image.

7. The electronic device of claim 1,
wherein the preview image includes a plurality of frames,
wherein the at least one processor is further configured to detect a voice input or a physical button input while displaying the preview image, and
wherein the partial area is determined based on at least one frame at a reception timing of the voice input or the physical button input among the plurality of frames.

8. The electronic device of claim 1,
wherein the thumbnail image is a moving image which is moved from another partial area including the first object to the partial area including the second object.

9. A method in an electronic device, comprising:
displaying a preview image being acquired by a camera module of the electronic device, the preview image including simultaneous display of a first object and a second object;
after displaying the preview image including simultaneous display of the first object and the second object, detecting a first touch input to the first object, followed by a second touch input to the second object, wherein:
in response to detecting the first touch input, forming a focus on the first object as to identify the first object in the preview image, and
the second touch input is detected to the preview image disposed on the second object, and is received within a predesignated time from a time at which the first touch input is detected;

in response to detecting the second touch input, determining a partial area of the preview image, wherein the partial area includes an entirety of the second object, excludes an entirety of the first object, and is less than an entire area of the preview image;
in response to receiving a capture command for the preview image, storing a current image of the preview image focused on the first object; and
after storing the image responsive to the capture command, generating a thumbnail image including the partial area less than the entire area of the preview image, and including the second object.

10. The method of claim 9, further comprising:
determining at least one frame corresponding to a reception timing of at least one touch input among plurality of frames of the preview image, and
displaying the thumbnail image based on the determined at least one frame.

11. The method of claim 10,
wherein the displaying the thumbnail image comprises determining the thumbnail image based on a reception location of the at least one touch input, and
wherein when the focus is formed on the first object responsive to the first touch input, no focus is formed on a background screen portion of the preview image, the background screen portion including the second object.

12. The method of claim 10,
wherein the thumbnail image is a moving image including the at least one frame in which the at least one touch input is detected.

13. The method of claim 9, further comprising:
identifying a first location of the first touch input and a second location of the second touch input, and
determining the partial area of the image including both the first location and the second location.

14. The method of claim 9, further comprising:
detecting an input for generating a layer of an image superimposed on a screen, and
determining a thumbnail image including the layer of an image.

15. The method of claim 9, further comprising detecting a voice input or a physical button input while displaying the preview image, and
wherein the partial area is determined based on at least one frame at a reception timing of the voice input or the physical button input among a plurality of frames of the preview image.

16. The method of claim 9, wherein the thumbnail image is a moving image which is moved from another partial area including the first object to the partial area including the second object.

17. A non-transitory computer-readable medium comprising one or more processor executable instructions which when executed by at least one processor cause the at least one processor to perform a process comprising the operations of:
displaying a preview image being acquired by a camera module of an electronic device, the preview image including simultaneous display of a first object and a second object;
after displaying the preview image including simultaneous display of the first object and the second object, detecting a first touch input to the first object, followed by a second touch input to the second object, wherein:

in response to detecting the first touch input, forming a focus on the first object as to identify the first object from the preview image, and the second touch input is detected to the preview image disposed on the second object and is received within a predesignated time from a time at which the first touch input is detected;

in response to detecting the second touch input, determining a partial area of the preview image, wherein the partial area includes an entirety of the second object, excludes an entirety of the first object, and is less than an entire area of the preview image;

in response to receiving a capture command for the preview image, storing a current image of the preview image focused on the first object; and after storing the image responsive to the capture command, generating a thumbnail image including the partial area less than the entire area of the preview image, and including the second object.

18. The non-transitory computer-readable medium of claim 17, wherein the thumbnail image is a moving image which is moved from another partial area including the first object to the partial area including the second object.

\* \* \* \* \*